(12) United States Patent
De Cuyper et al.

(10) Patent No.: US 11,155,043 B2
(45) Date of Patent: Oct. 26, 2021

(54) SONOTRODE AND ANVIL FOR ULTRASONIC WELDING OF PLASTICS, METHOD FOR PRODUCING A PLASTIC CONTAINER

(71) Applicant: RESILUX NV, Wetteren (BE)

(72) Inventors: Dirk De Cuyper, Destelbergen (BE); William Dierickx, Destelbergen (BE); Tom Anthierens, Wetteren (BE)

(73) Assignee: RESILUX NV, Wetteren (BE)

( * ) Notice: Subject to any disclaimer, the term of this patent is extended or adjusted under 35 U.S.C. 154(b) by 219 days.

(21) Appl. No.: 16/341,633

(22) PCT Filed: Oct. 18, 2017

(86) PCT No.: PCT/IB2017/056466
§ 371 (c)(1),
(2) Date: Apr. 12, 2019

(87) PCT Pub. No.: WO2018/073755
PCT Pub. Date: Apr. 26, 2018

(65) Prior Publication Data
US 2019/0375166 A1    Dec. 12, 2019

(30) Foreign Application Priority Data

Oct. 18, 2016    (BE) .................................. 2016/5777

(51) Int. Cl.
*B32B 37/00*    (2006.01)
*B29C 65/08*    (2006.01)
(Continued)

(52) U.S. Cl.
CPC .......... *B29C 65/08* (2013.01); *B29C 66/1122* (2013.01); *B29C 66/21* (2013.01);
(Continued)

(58) Field of Classification Search
USPC ................................ 156/73.1, 580.1, 580.2
See application file for complete search history.

(56) References Cited

U.S. PATENT DOCUMENTS

| 5,804,008 A | 9/1998 | Kennard et al. |
| 5,931,324 A * | 8/1999 | Lyons ................. B29C 66/1122 |
| | | 215/398 |
| 2015/0090405 A1 | 4/2015 | Hull |

FOREIGN PATENT DOCUMENTS

| DE | 10 2010 039 003 A1 | 2/2012 |
| EP | 0 242 480 A2 | 10/1987 |
| EP | 2 804 247 A1 | 11/2014 |

OTHER PUBLICATIONS

International Search Report (PCT/ISA/210) issued in PCT/IB2017/056466, dated Jan. 31, 2018.
(Continued)

*Primary Examiner* — James D Sells
(74) *Attorney, Agent, or Firm* — Birch, Stewart, Kolasch & Birch, LLP

(57) ABSTRACT

A combination of a sonotrode and anvil, includes a sonotrode/anvil surface and a first row of sonotrode/anvil welding contact elements. The first/second series of each of the sonotrode/anvil welding contact element of a first row includes a first/second adapted lateral surface that joins at least one part of the first/second plateau surface with at least one part of the sonotrode/anvil surface side. The first/second adapted lateral surface includes a first/second curved surface positioned between the first/second plateau surface and the first/second substantially straight surface. The first/second curved surface has a convex outward arch. The welding contact element is positioned in relation to the anvil welding contact element such that the sonotrode welding contact (Continued)

element is positioned during welding next to the anvil welding contact element and is provided to form at least one part of a weld seam.

20 Claims, 19 Drawing Sheets

(51) Int. Cl.
*B29C 65/00* (2006.01)
*B29L 23/20* (2006.01)
(52) U.S. Cl.
CPC ...... *B29C 66/232* (2013.01); *B29C 66/73921* (2013.01); *B29L 2023/20* (2013.01)

(56) References Cited

OTHER PUBLICATIONS

Written Opinion (PCT/ISA/237) issued in PCT/IB2017/056466, dated Jan. 31, 2018.

* cited by examiner

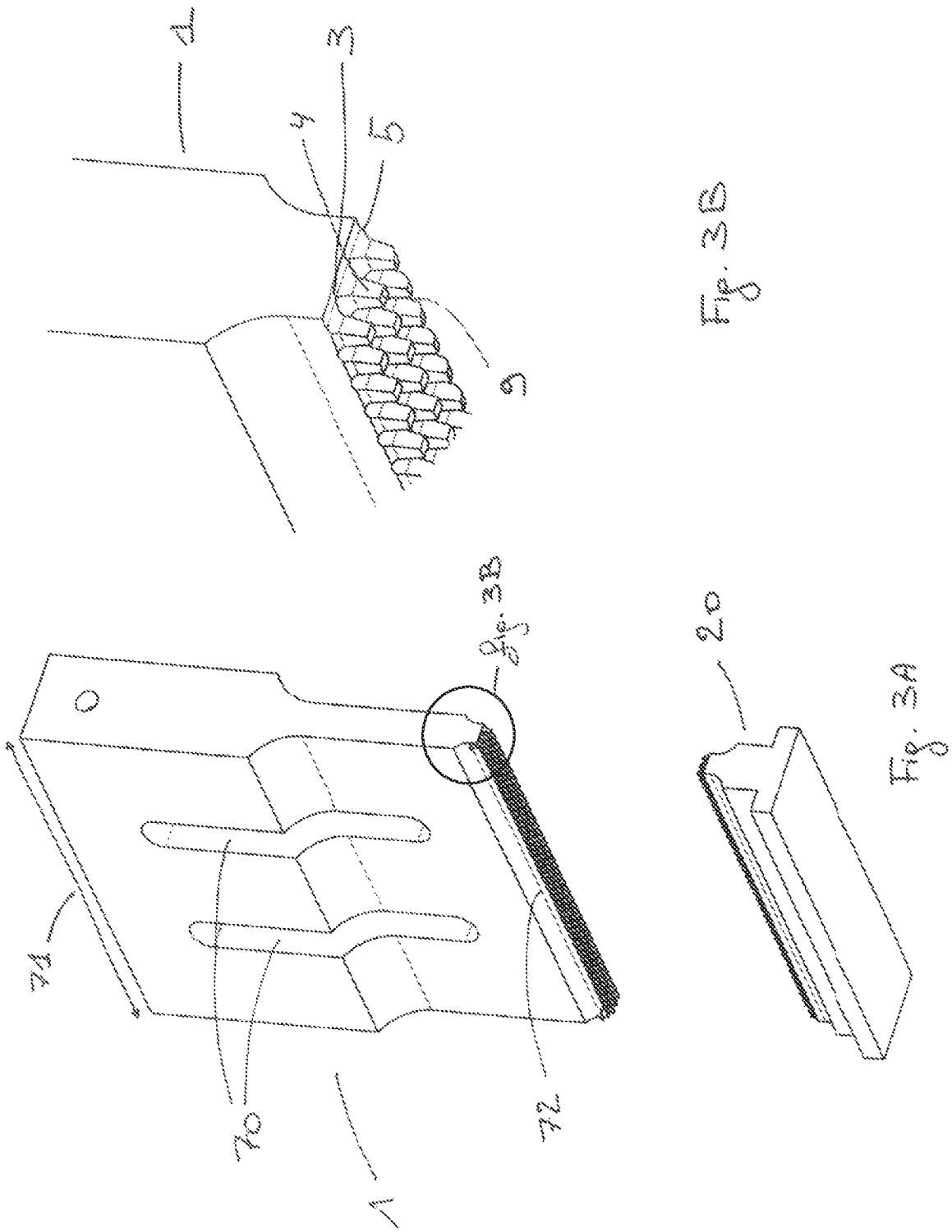

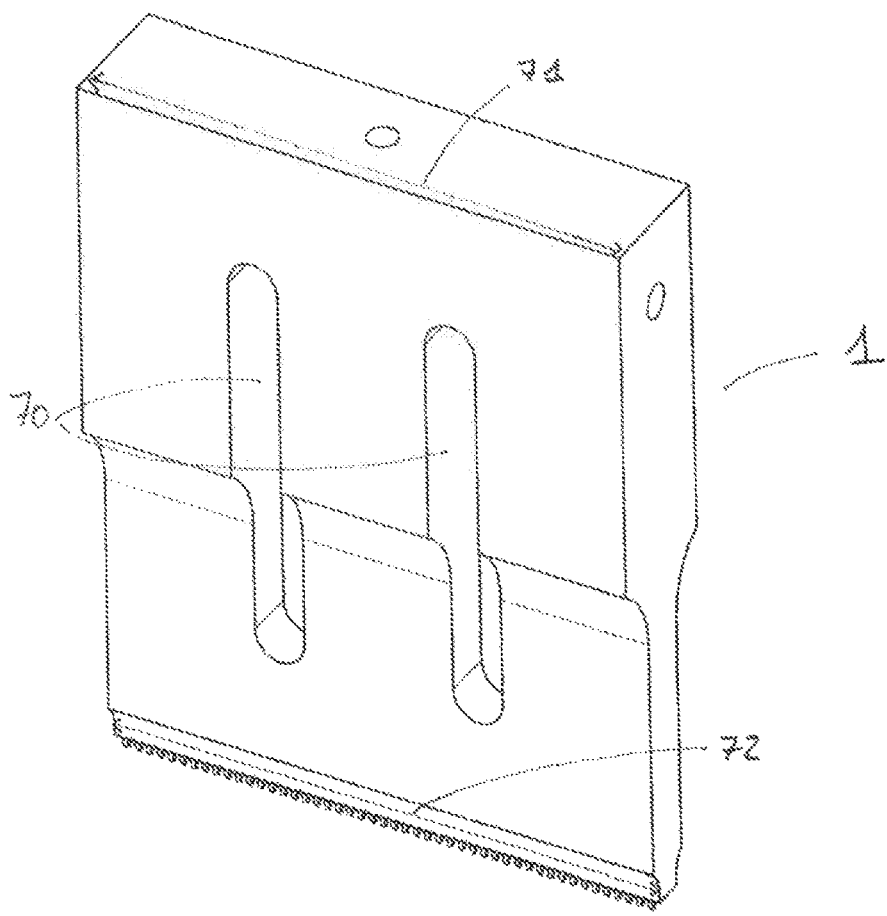
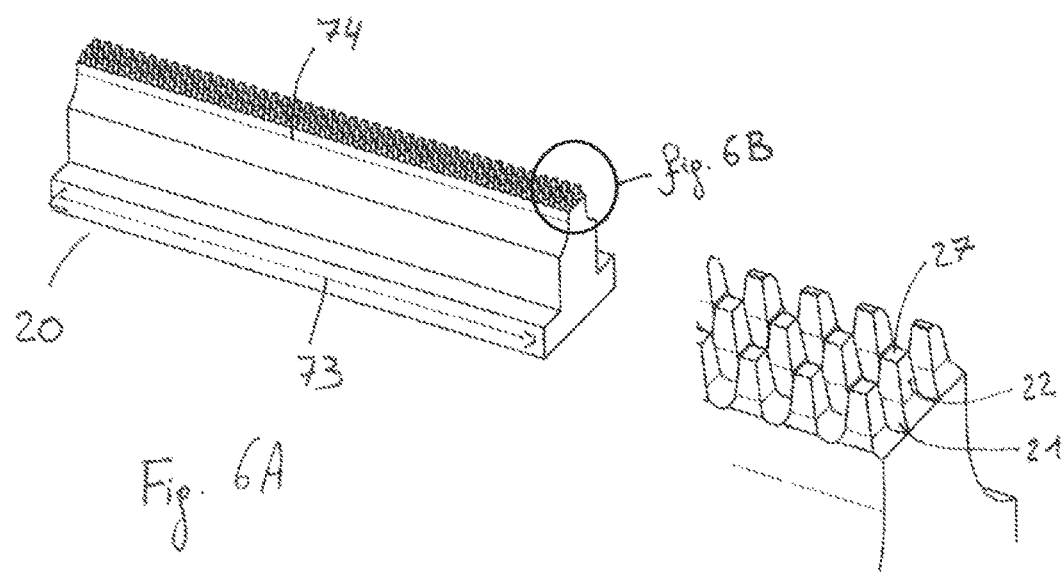
Fig. 6A
Fig. 6B

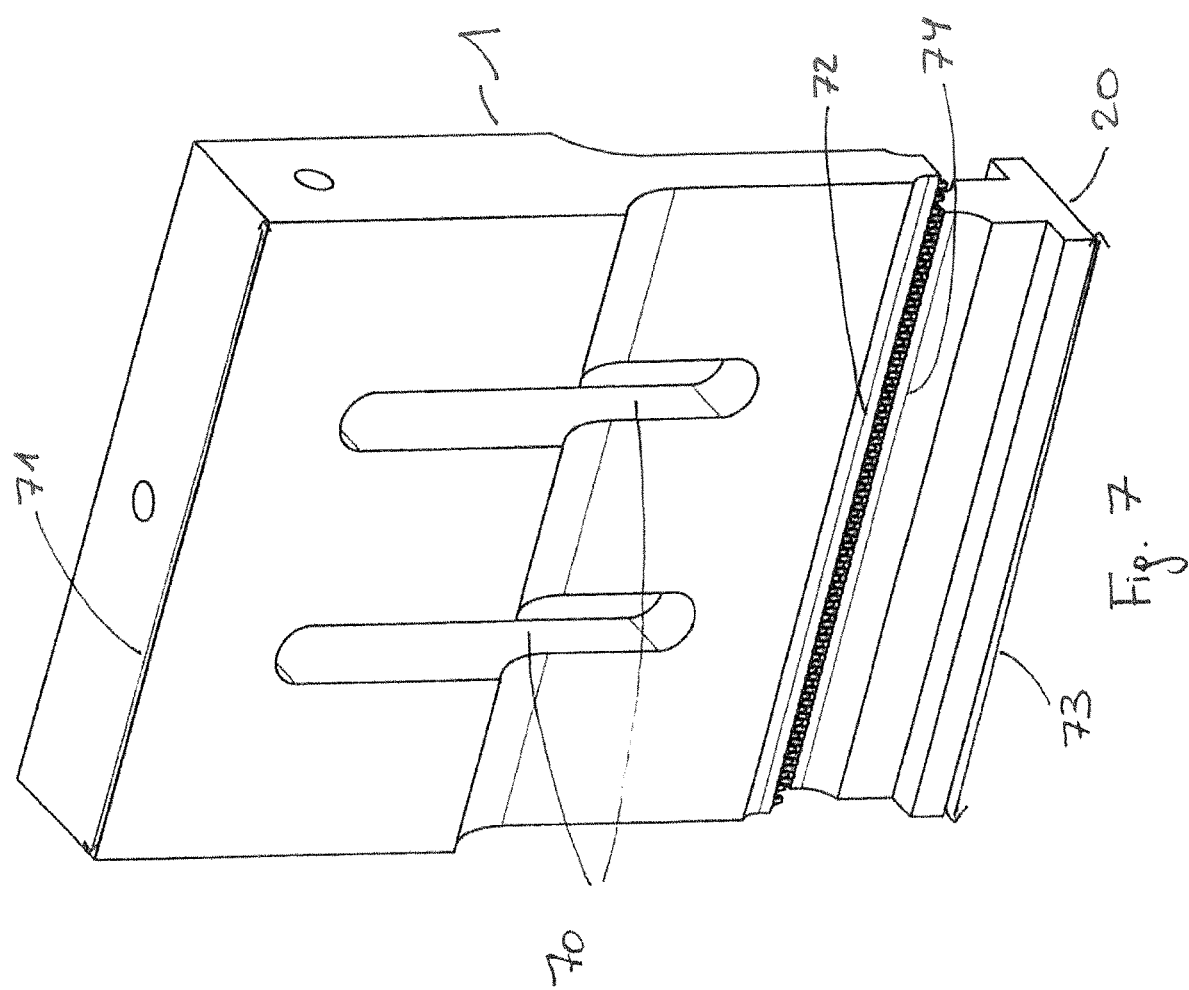

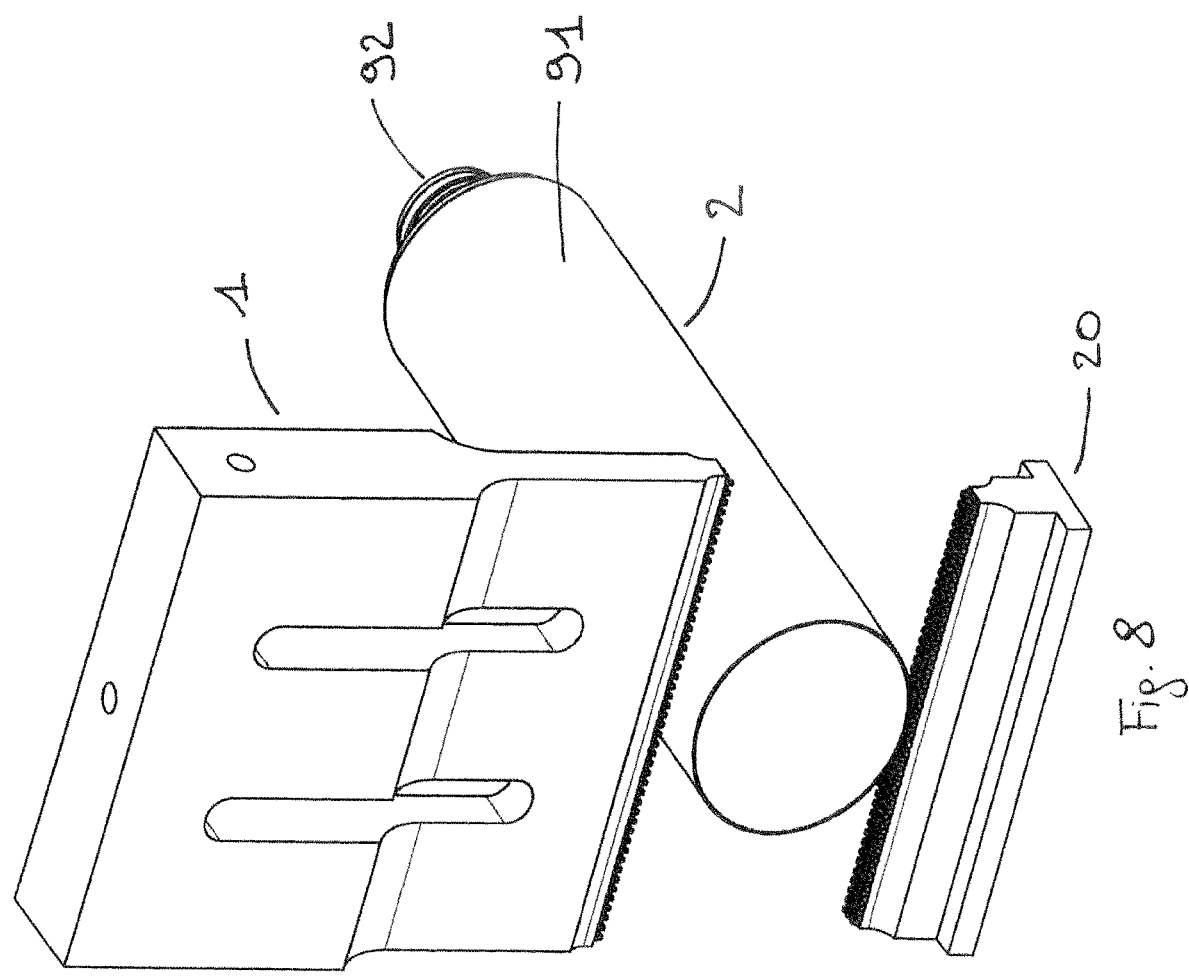

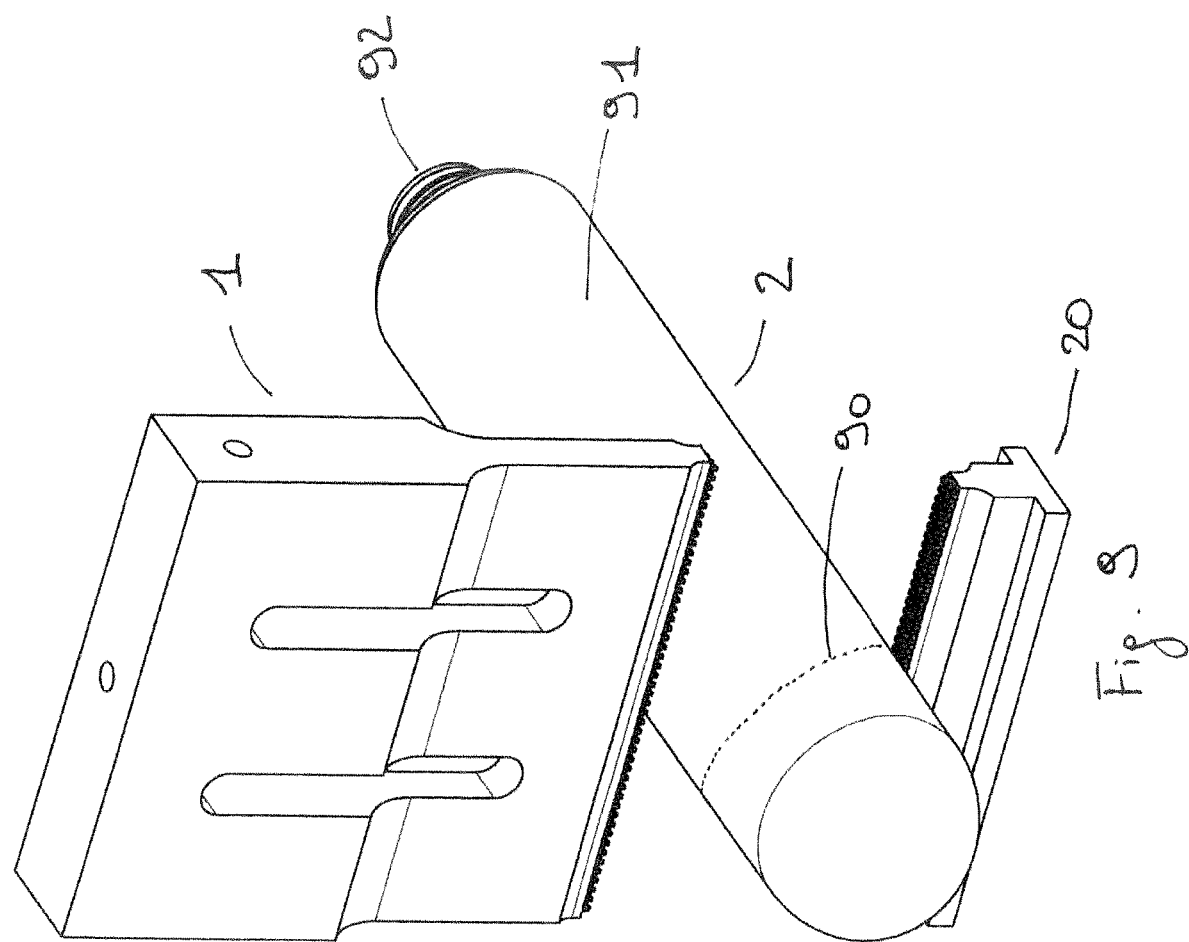

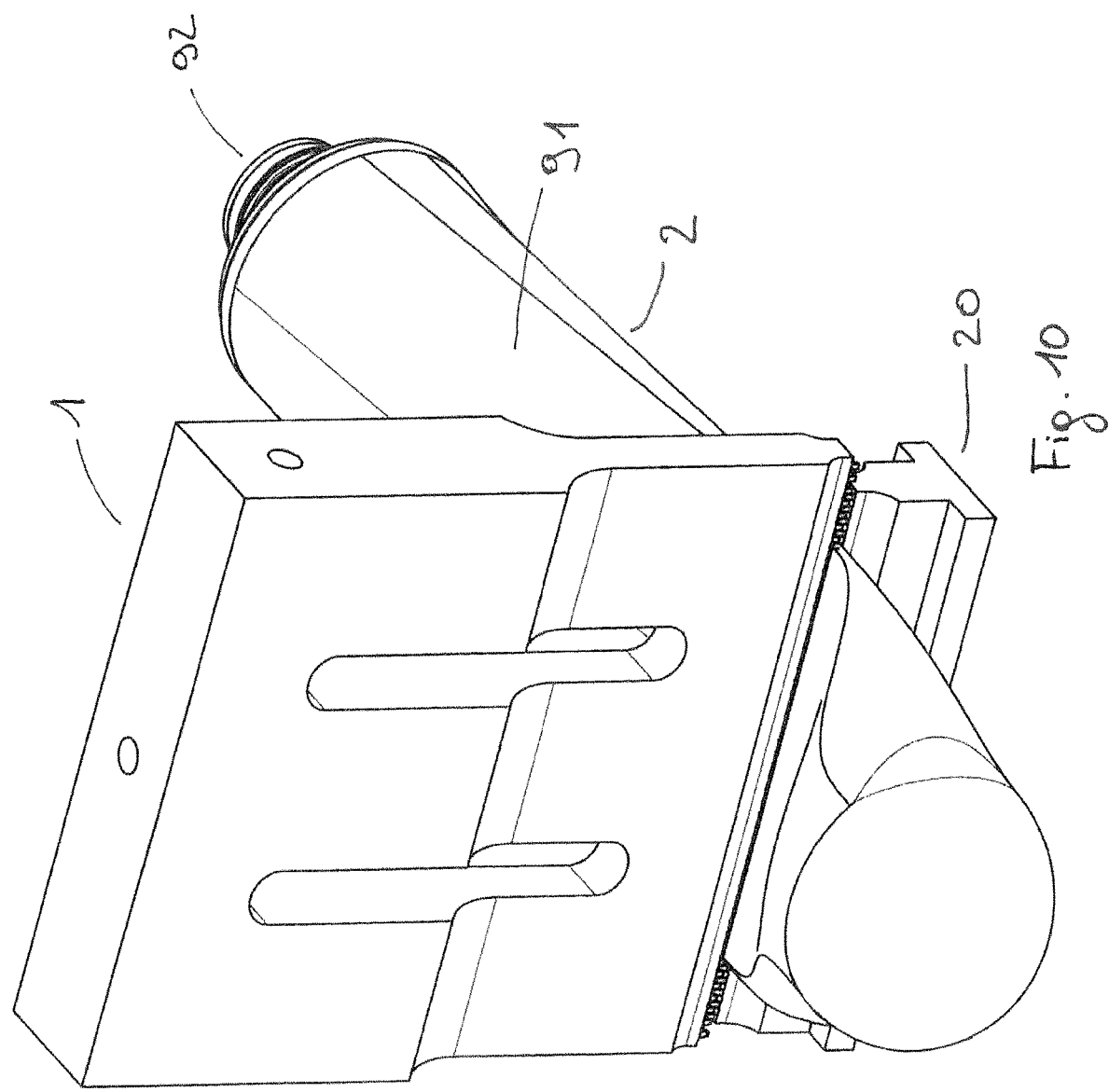

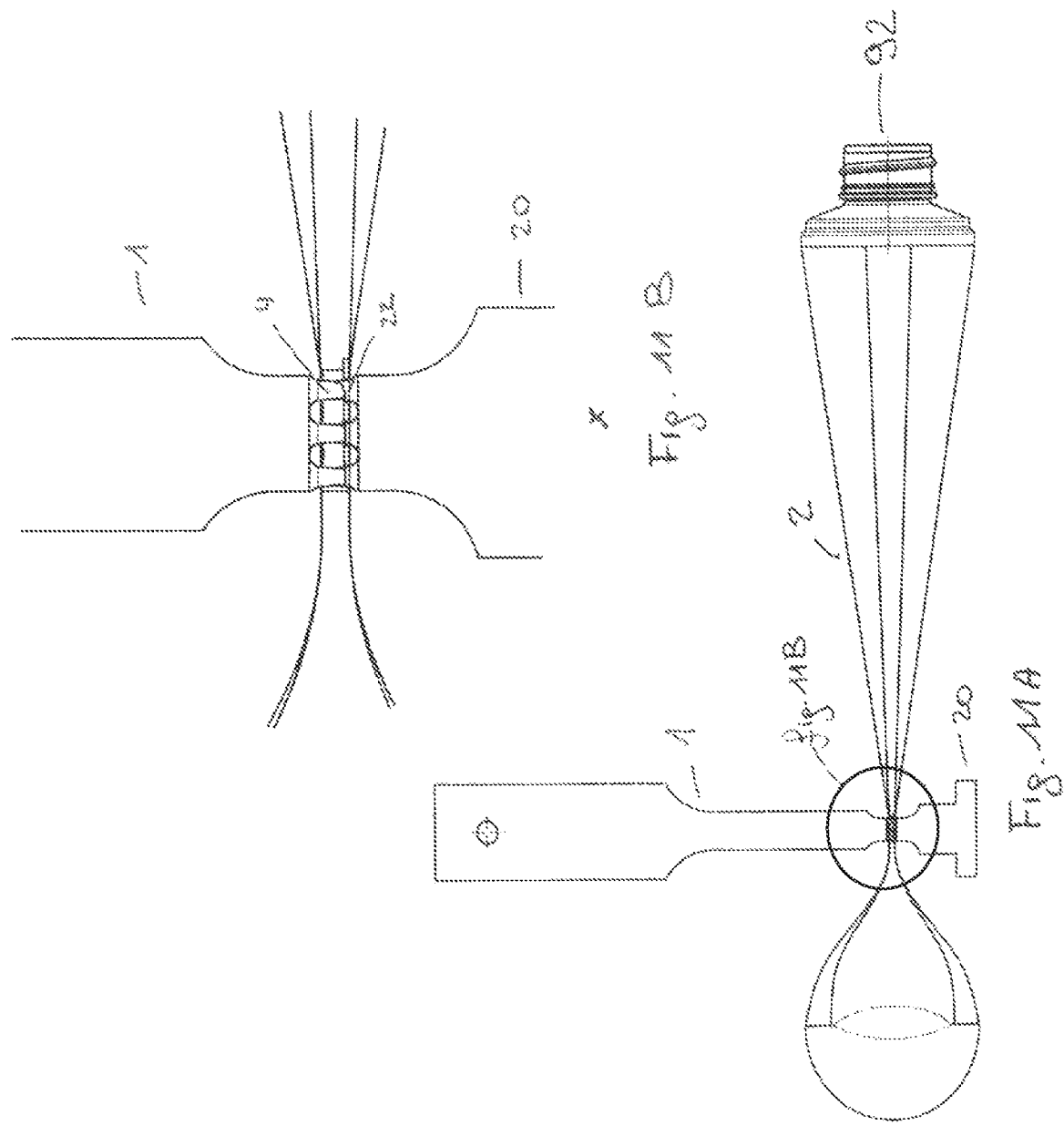

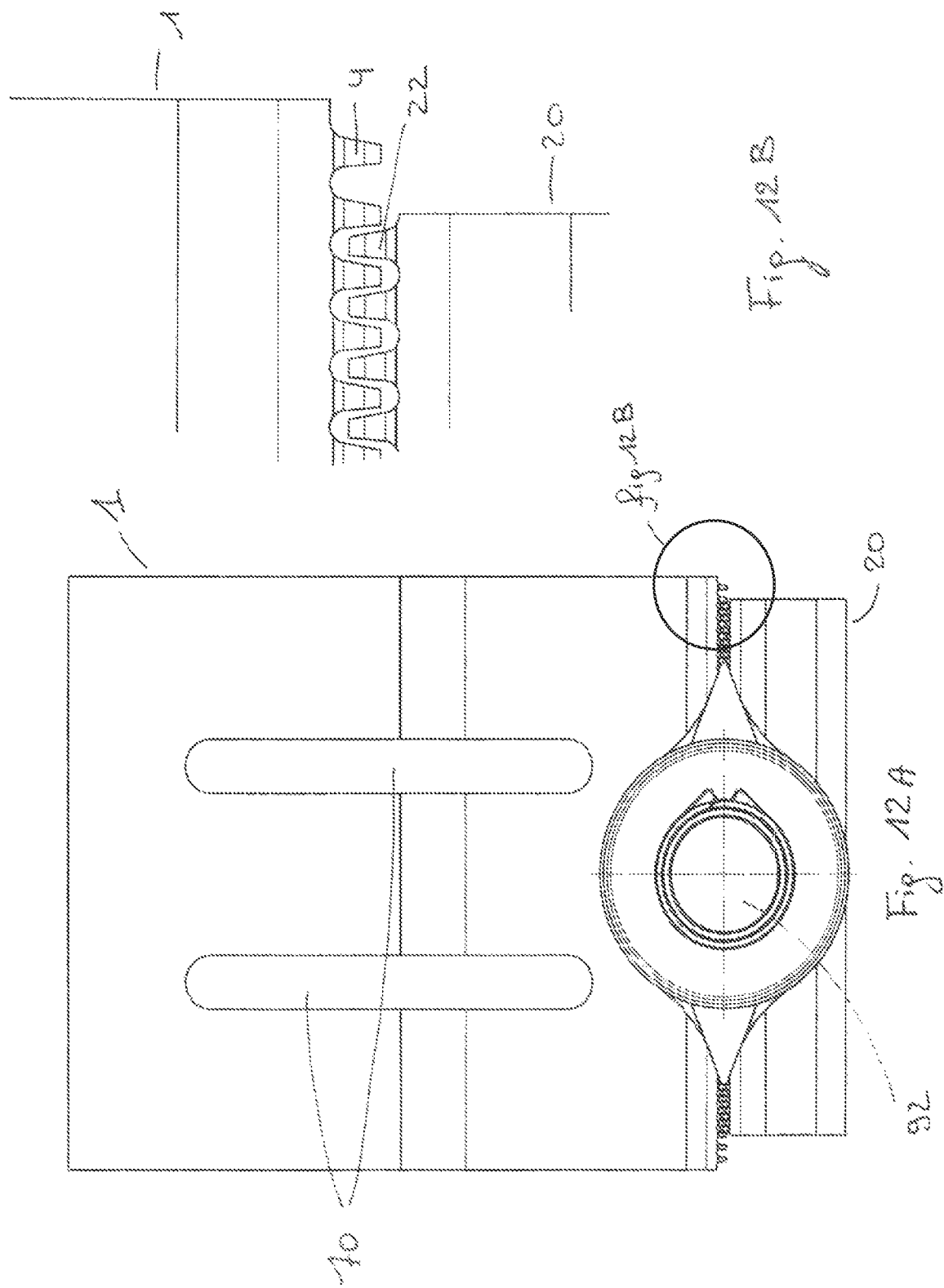

SONOTRODE AND ANVIL FOR ULTRASONIC WELDING OF PLASTICS, METHOD FOR PRODUCING A PLASTIC CONTAINER

FIELD OF TECHNOLOGY

The present invention relates to a combination of a sonotrode and an anvil for ultrasonic welding of plastic, preferably a plastic container, and to a method for producing a plastic container, preferably a tube, comprising at least one ultrasonically-welded seal, and to a method for filling the plastic container. More particularly, the present invention relates to stretch blown plastic containers.

PRIOR ART

Plastics can, largely, be divided into two categories, i.e. thermoplastic plastics and thermoset plastics. A thermoset plastic, also referred to as a thermosetting or thermoset polymer, comprises polymers that can be melted once into a particular form, after which the curing precludes any further melting step. Conversely, thermoplastic plastics, also referred to as thermoplastics, can be repeatedly softened or even melted.

Thermoplastics can be further divided into amorphous and semi-crystalline thermoplastics. Examples of amorphous thermoplastics are acrylonitrile-butadiene-styrene (ABS), acrylic, polyvinylchloride (PVC) and polycarbonate (PC). Examples of semi-crystalline thermoplastic materials are polyethylene/polythene (PE), polypropylene (PP), polyamide (PA) and polyester.

It is generally known that ultrasonic welding allows thermoplastic plastics to be joined together. With ultrasonic welding mechanical vibrations are converted into heat as a result of which the plastic layers undergo molecular melting, whereby the plastics are placed between an anvil and a sonotrode.

Tubes, known as flexible plastic containers, are typically made from PE (high density), or via an injection moulding process whereby the filled tube is sealed as a whole, or in two steps whereby first a pipe is extruded, and the cap is sealed with the mouth. In a second step both parts are then welded together to form a tube. The latter is especially preferred, given that it allows tubes to be produced in very large quantities and with a high level of automation and the length of the container can be adjusted by varying the cropping of the extruded pipe. The disadvantage of these methods and materials, however, is the lack of transparency given that it is not possible to extrude PE as a crystal-clear material. Furthermore, customisation of the tube via extrusion or injection moulding is limited. With filling also, there are a number of disadvantages given that after filling the tube has a hot stamp applied meaning that it cannot be filled to a sufficient height.

Techniques are already known in the prior art offering a solution to these disadvantages. These techniques mostly make use of a method comprising a step of stretch blowing, as in injection stretch blowing moulding (ISBM). A disadvantage of flexible plastic containers, preferably tubes, produced by a method comprising a step of stretch blowing, as in injection stretch blowing moulding (ISBM), is that these flexible plastic containers, preferably tubes, exhibit a relatively large concentric wall thickness difference. In the known welding techniques for sealing flexible plastic containers, preferably tubes, (i.e. using a hot stamp) use is made in the main of flat pressing systems for sealing off the flexible plastic containers, preferably tubes. These welding techniques are unusable for flexible plastic containers, preferably tubes, produced via the stretch blowing technique, given that due to the concentric wall thickness differences an uneven compression load occurs. As a result, in these flexible plastic containers, preferably tubes, the desired weld seam strength cannot be achieved.

Various ultrasonic welding units are known according to the prior art. EP0242480A2 describes an ultrasonic welding unit with a sonotrode and an anvil on the protrusions from its flat upper surfaces with slanted sides. DE102010039003A1 describes a facility that welds and embosses a workpiece in a single operation. EP2804247A1 describes a welding unit with a pressure vibrator and a jig receiver positioned to face the pressure vibrator. In the latter welding unit, the pressure vibrator and the jig receiver hold the part to be welded and place this under pressure, while an ultrasonic vibration is applied. The pressure vibrator and the jig receiver have irregular work contact faces with projections that are chamfered and must face each other in order to create a very small pressurised area that breaks the heat-resistant layers amongst the object to be welded. Consequently, the only possible weld seam structure is achieved by placing the projections on the pressure vibrator and the jig receiver opposite each other. A disadvantage of these welding units is that they do not allow an effective and strong weld seam to be obtained.

OBJECT OF THE INVENTION

The invention is aimed in particular at overcoming these disadvantages from the prior art. More specifically, an object of the invention is to provide a combination of a sonotrode and anvil in order to effectively weld plastic layers.

More particularly, an object of the invention according to at least one embodiment is to provide a plastic container, preferably a tube, which can offer greater resistance to splitting of the weld seam as a result of external pressure changes.

Another object of the invention according to at least one of the embodiments is to provide a method for producing a plastic container, preferably a tube, comprising an ultrasonic welding step.

Another object of the invention according to at least one of the embodiments is to provide a filling method for the plastic container, preferably a tube, whereby a sufficiently large volume of the plastic container can be filled.

SUMMARY

The object of the present invention is to provide a solution that meets the aforesaid needs. The present invention provides for a combination of a sonotrode and an anvil whereby aforesaid sonotrode for ultrasonic welding of plastic, preferably a plastic container, comprises a. a sonotrode surface, preferably rectangular, for positioning of sonotrode welding contact elements, aforesaid sonotrode surface comprising at least one sonotrode surface side, b. at least one row of at least one sonotrode welding contact element provided so that during the welding it is in contact with the plastic, whereby aforesaid sonotrode welding contact element comprises a first plateau surface and a first series of at least one first lateral surface, whereby aforesaid first lateral surface comprises a first substantially straight surface, whereby aforesaid at least one row of at least one sonotrode welding contact element is positioned according to aforesaid sonotrode surface side, whereby aforesaid first series of each aforesaid sonotrode welding contact element of a first row comprises a first adapted lateral surface that joins at least one part of aforesaid first plateau surface with at least one part of aforesaid sonotrode surface side, whereby aforesaid first adapted lateral surface comprises a first curved surface positioned between aforesaid first plateau surface and aforesaid first substantially straight surface, whereby aforesaid first curved surface has a convex outward arch, and whereby the aforesaid anvil for ultrasonic welding of plastic, preferably a plastic container, comprises c. an anvil surface, preferably rectangular, for positioning of anvil welding contact elements, aforesaid anvil surface comprising at least one anvil surface side, d. at least one row of at least one anvil welding contact element provided so that during welding it is in contact with the plastic, whereby aforesaid anvil welding contact element comprises a second plateau surface and a second series of at least one second lateral surface, whereby aforesaid second lateral surface comprises a second substantially straight surface, whereby aforesaid at least one row of at least one anvil welding contact element is positioned according to aforesaid anvil surface side, whereby aforesaid first aforesaid second series of each aforesaid anvil welding contact element of a first row comprises a second adapted lateral surface that joins at least one part of aforesaid second plateau surface with at least one part of aforesaid anvil surface side, whereby aforesaid second adapted lateral surface comprises a second curved surface positioned between aforesaid second plateau surface and aforesaid second substantially straight surface, whereby aforesaid second curved surface has a convex outward arch.

Aforesaid sonotrode welding contact element is positioned in relation to aforesaid anvil welding contact element such that aforesaid sonotrode welding contact element is positioned during welding next to aforesaid anvil welding contact element and is provided to form each at least one part of a weld seam.

The inventors have, surprisingly, found that a combination of a sonotrode and an anvil as described above has the advantage of providing a weld seam structure in the plastic layers to be welded that reduces the likelihood of splitting of the weld seam in the event of sudden or other pressure changes, for example if a plastic container falls under force of gravity.

Moreover, a combination of a sonotrode according to the invention and an anvil according to the invention, whereby aforesaid sonotrode welding contact element is positioned in relation to aforesaid anvil welding contact element such that aforesaid sonotrode welding contact element is positioned during welding next to aforesaid anvil welding contact element provided to form each at least one part of a weld seam. By "positioned next to", reference can be made to "positioned in the space between neighbouring welding contact elements" or "positioned at one edge of a welding contact element". An advantage of this embodiment is that the alternate alignment of the sonotrode and anvil welding contact elements, or the alternating positioning of sonotrode and anvil welding contact elements such that the space between two neighbouring sonotrode welding contact elements can be filled with an anvil welding contact element whenever the sonotrode and the anvil move towards each other, increases the welding contact surface between the plastic layers to be welded and the welding contact elements. As a consequence, a stronger weld seam is obtained.

In a particular embodiment of the invention, aforesaid first substantially straight surface and aforesaid first plateau surface of aforesaid sonotrode welding contact element define an angle theta, whereby theta is situated in the range 75° to 90°, preferably in the range 82° to 88°. An advantage of this embodiment is that the tip of the sonotrode welding contact element is suitable, under the contact force used by the sonotrode, to penetrate sufficiently deeply into the plastic layers to be welded whereby even plastic containers with concentric wall thickness differences, preferably produced by a method comprising a step of stretch blowing, can be welded.

In a particular embodiment of the invention, aforesaid sonotrode welding contact element defines a first height H1 and a first width B1, whereby aforesaid first height H1 is at least bigger than aforesaid first width B1, preferably at least bigger than twice aforesaid first width B1. An advantage of this structure is that the sonotrode welding contact elements are positive protrusions able to penetrate the plastic layers to be welded. The first height H1 of a sonotrode welding contact element is measured as the shortest distance between the sonotrode surface and the midpoint of the first plateau surface of the sonotrode welding contact element. The first width B1 is measured as the smallest distance between two opposing first lateral surfaces measured at a height equal to 30% of the first height H1 measured from the sonotrode surface on which the sonotrode welding contact element is positioned.

According to a particular embodiment of the invention, the size of aforesaid first plateau surface of aforesaid sonotrode welding contact element is smaller than 25 mm$^2$, preferably smaller than 10 mm$^2$, and more particularly smaller than 1 mm$^2$. An advantage of this embodiment is that there is a sufficiently large contact surface between aforesaid first plateau surfaces and the plastic to be welded, whereby the strength of the weld seam can be increased.

In a particular embodiment of the invention, aforesaid second substantially straight surface and aforesaid second plateau surface of aforesaid anvil welding contact element define an angle gamma, whereby gamma is situated in the range 75° to 90°, preferably in the range 82° to 88°. An advantage of this embodiment is that the tip of the anvil welding contact element is suitable, under the contact force used, to penetrate sufficiently deeply into the plastic layers to be welded whereby even plastic containers with concentric wall thickness differences can be welded.

In a particular embodiment of the invention, aforesaid anvil welding contact element defines a second height H2 and a second width B2, whereby aforesaid second height H2 is at least bigger than aforesaid second width B2, preferably at least bigger than twice aforesaid second width B2. An advantage of this structure is that the anvil welding contact elements are positive protrusions able to penetrate the plastic layers to be welded. The second height H2 of an anvil welding contact element is measured as the shortest distance between the anvil surface and the midpoint of the second plateau surface of the anvil welding contact element. The second width B2 is measured as the smallest distance between two opposing second lateral surfaces measured at a height equal to 30% of the second height H2 measured from the anvil surface on which the anvil welding contact element is positioned.

In a particular embodiment, the size of aforesaid second plateau surface of aforesaid anvil welding contact element is smaller than 25 mm$^2$, preferably smaller than 10 mm$^2$, and more particularly smaller than 1 mm$^2$. An advantage of this embodiment is that the anvil welding contact element can ensure a sufficiently large contact surface between aforesaid second plateau surfaces and the plastic to be welded, whereby the strength of the weld seam can be increased.

In a particular embodiment of the invention, aforesaid first row of ultrasonic welding contact elements is positioned directly opposite aforesaid first row of anvil welding contact elements. An advantageous aspect of this embodiment is that the weld seam formed has a weld structure that is substantially uniform whereby the strength of the weld seam is less dependent on position.

In a particular embodiment of the invention, the ratio of H1 to B1 is the same as the ratio H2 to B2. This embodiment allows the sonotrode and anvil welding contact elements to penetrate evenly into the plastic layers to be welded whereby the strength of the weld seam is less dependent on position.

According to another aspect of the invention, a method is provided for producing a plastic container, comprising at least one step of ultrasonic welding of aforesaid plastic container for the forming of a weld seam according to a weld section on at least one part of a blow-moulded surface of aforesaid plastic container to provide aforesaid plastic container with at least one seal, whereby aforesaid step of ultrasonic welding is carried out by aforesaid combination according to the invention. The inventors have, surprisingly, found that plastic containers produced by aforesaid method have a strong weld seam structure whereby the likelihood of splitting of the weld seam in the event of sudden or other pressure changes is reduced.

According to a preferred method of execution of the invention, aforesaid method during the step of ultrasonic welding comprises the steps of determining aforesaid weld section on aforesaid blow-moulded surface of aforesaid plastic container, clamping aforesaid plastic container between aforesaid sonotrode and/or aforesaid anvil, preferably between the combination, whereby aforesaid welding contact elements are joined with at least one part of aforesaid weld section, and forming of aforesaid weld seam.

According to a preferred method of execution of the invention, aforesaid method for producing a plastic container further comprises the steps of injection moulding a plastic container preform that can be extended biaxially, i.e. along two axes perpendicular with one another, whereby aforesaid plastic container preform comprises an open mouth and a sealed bottom, whereby aforesaid open mouth is positioned opposite aforesaid sealed bottom, and stretch blowing of aforesaid biaxially extendable plastic container preform in a blow mould, whereby aforesaid plastic container preform expands biaxially in aforesaid blow mould into aforesaid plastic container comprising aforesaid blow-moulded surface that is to be at least in part ultrasonically welded.

According to a preferred method of execution for producing a plastic container according to the invention, the method comprises a step of embossing aforesaid blow-moulded surface during aforesaid step of stretch blowing, whereby aforesaid step of embossing is carried out in aforesaid blow mould comprising at least plate, preferably an etched plate. This allows plastic containers with a strong weld seam to also be provided with embossing.

According to a preferred method of execution of the method for producing a plastic container according to the invention, the method further comprises a step of cutting aforesaid plastic container, whereby aforesaid step of cutting is carried out before, during or after the ultrasonic welding of aforesaid plastic container.

The invention also relates to a method for producing a plastic container according to the invention, whereby aforesaid step of cutting is carried out mechanically or ultrasonically.

The invention also relates to a plastic container, preferably a tube, obtained according to at least one embodiment of the invention.

The invention also relates to a method for filling a plastic container obtained according to the invention, whereby the filling takes place through aforesaid mouth. The advantage of this method is that plastic containers can be filled to a greater volume compared with the standard fill levels. In particular, plastic containers, preferably tubes, obtained according to the invention are filled whereby the free headroom, i.e. the fluid-free volume of the plastic container at the mouth, is reduced to 10 ml, preferably to 5 ml, of more preferably to almost 0 ml. This means that up to 1 cm, preferably up to 0.5 cm, more preferably even less than 0.5 cm from the weld seam.

Another aspect of the invention relates to the use of a plastic container according to any one of claims 10 to 15, for the packaging of pharmaceuticals, medicines, cosmetics and foodstuffs.

BRIEF DESCRIPTION OF THE FIGURES

To better demonstrate the characteristics of the invention, in the following, by way of example and without being restrictive in any way, at least one preferred embodiment is described of a sonotrode, an anvil and a combination of the sonotrode and the anvil according to the present invention, as well as a description of at least one preferred method for producing a plastic container, preferably a tube, with reference to the attached drawings, in which FIG. 1A, abbreviated as FIG. 1A, is a cross-section of a sonotrode according to an embodiment of the present invention.

FIG. 3A, abbreviated as FIG. 3A, is an isometric view of the sonotrode in FIG. 1A.

FIG. 3B, abbreviated as FIG. 3B, is an enlarged detailed view of the sonotrode in FIG. 3A.

FIG. 6A, abbreviated as FIG. 6A, is an isometric view of the anvil in FIG. 4A.

FIG. 6B, abbreviated as FIG. 6B, is a detailed view of the anvil in FIG. 6A.

FIG. 7, abbreviated as FIG. 7, is an isometric view of a combination of the sonotrode and the anvil according to a preferred embodiment of the invention.

FIG. 8, abbreviated as FIG. 8, is an isometric view of the combination in FIG. 7, whereby a plastic container is positioned between the sonotrode and the anvil.

FIG. 9, abbreviated as FIG. 9, is an isometric view of the combination in FIG. 7, whereby a plastic container is positioned between the sonotrode and the anvil for forming a weld seam on at least one part of the blow-moulded surface.

FIG. 10, abbreviated as FIG. 10, is an isometric view of the combination in FIG. 7, whereby a plastic container is clamped between the sonotrode and the anvil for forming a weld seam on at least one part of the blow-moulded surface.

FIG. 11A, abbreviated as FIG. 11A, is a cross-section of the combination in FIG. 10.

FIG. 11B, abbreviated as FIG. 11B, is a detailed view of the cross-section in FIG. 11A.

FIG. 12A, abbreviated as FIG. 12A, is a front view of the combination in FIG. 10.

FIG. 12B, abbreviated as FIG. 12B, is a detailed view of the front view in FIG. 12A.

DETAILED DESCRIPTION

Figure 1A:
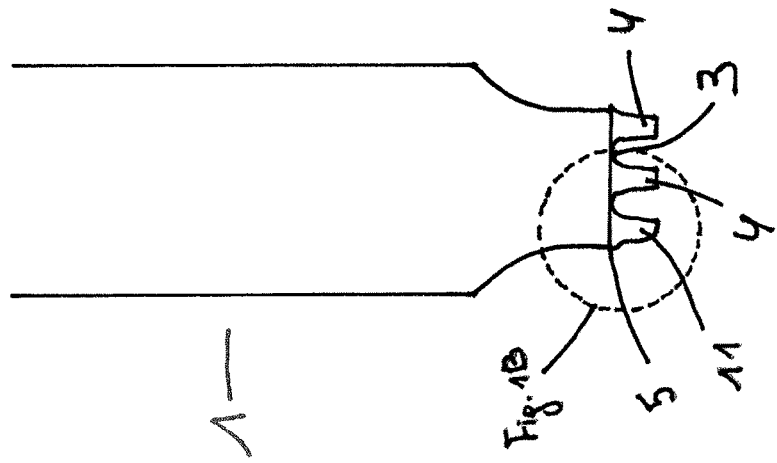
FIG. 1B, abbreviated as FIG. 1B, is an enlarged detailed view of the shown in FIG. 1A.

FIG. 1A shows a cross-section of a sonotrode 1 according to a preferred embodiment of the present invention. The sonotrode 1, also referred to as a horn in the relevant prior art, is provided to be connected to an optional booster (not shown) and a converter or transducer (not shown). The sonotrode 1 serves for ultrasonic welding of plastic, preferably a plastic container 2, and comprises a sonotrode surface 3 on which three rows of at least one sonotrode welding contact element 4 are positioned. The sonotrode welding contact elements, also known as energy directors in the prior art, are positive protrusions provided so that during the ultrasonic welding of the plastic layers they are in contact with at least a part of the plastic layers. The sonotrode surface 3 is preferably rectangular or quadrangular, and comprises at least one sonotrode surface side 5. The sonotrode 1 has been specially developed to transfer mechanical energy to the plastic to be ultrasonically welded. The sonotrode 1 is preferably made of aluminium, steel or titanium. Aluminium is more often used for low volume applications since an aluminium sonotrode 1 wears more quickly than titanium or steel. The material of the sonotrode 1 is not limited to the aforesaid materials, however. The sonotrode welding contact elements 4 can also be especially hardened so that wear from usage is slower to occur.

Figure 1B:
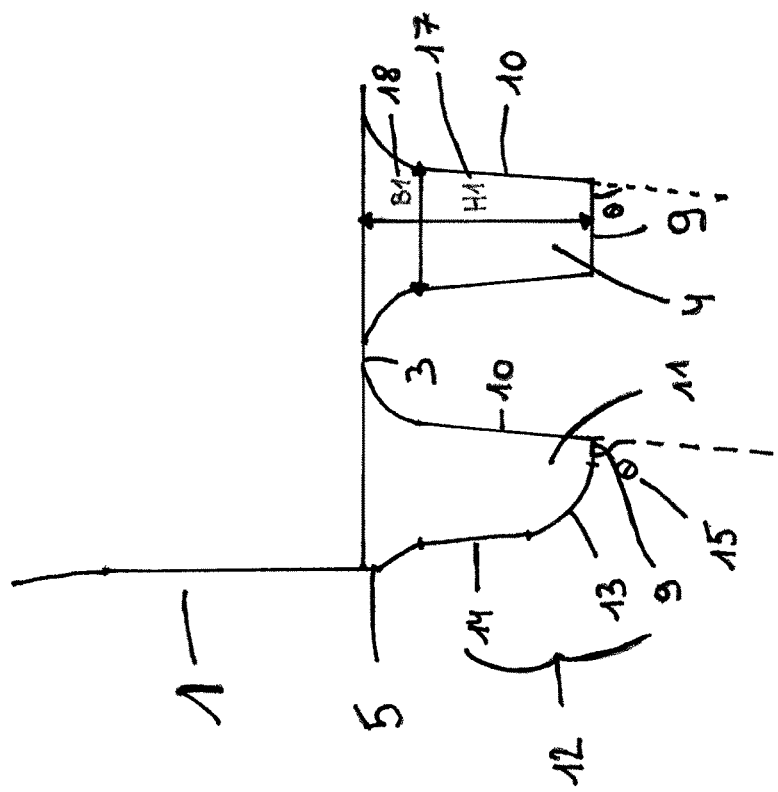

In FIG. 1B a detailed view is shown of the cross-section of the sonotrode 1 in FIG. 1A. A first row 11 of sonotrode welding contact elements 4 differs from the other rows of sonotrode welding contact elements 4 in that aforesaid first row 11 of sonotrode welding contact elements 4 comprises a first adapted lateral surface 12, whereby the adapted lateral surface 12 comprises a substantially straight surface 14 and a first curved surface 13 that has a convex outward arch. Sonotrode welding contact elements 4 of the first row 11 are consequently defined by aforesaid adapted lateral surface 12, and typically three first lateral surfaces 10, that are connected to at least one part of a first plateau surface 9. According to a preferred embodiment of the sonotrode according to the invention, the first adapted lateral surface 12 is connected to at least one part of the first plateau surface 9 and at least one part of the plateau surface side 5. The number of first lateral surfaces 10 is not limited by aforesaid number. It should be noted that where reference is made to sonotrode welding contact elements 4 of the first row 11 reference is only being made to sonotrode welding contact elements 4 of the first row 11 that are provided so that during the ultrasonic welding they are in direct contact with the plastic to be welded. Sonotrode welding contact elements 4 of the first row 11 that are not provided to be in direct contact with the plastic or plastic layers to be welded are not limited to aforesaid structure. The sonotrode welding contact elements 4 of the other rows, i.e. not first row 11, are defined by a first series of first lateral surfaces 10 and a first plateau surface 9. During the ultrasonic welding of a plastic the first plateau surface 9 of the sonotrode welding contact element 4 will make direct contact with an at least one part of the plastic to be welded.

These first lateral surfaces 10 are connected to at least one part of the first plateau surface 9. According to a particular embodiment of the invention, the first plateau surface 9 of sonotrode welding contact elements 4 of the first row is smaller than the first plateau surfaces 9 of the sonotrode welding contact elements 4 of the non-first row. The first plateau surface 9 of sonotrode welding contact elements 4 of the non-first row is preferably rectangular with a surface of 0.80 mm×0.88 mm, unlike the first plateau surface 9 of sonotrode welding contact elements 4 of the first row that have a surface of 0.1 mm×0.88 mm. However, the shape of the first plateau surfaces 9, and the dimensions are not limited to aforesaid form and dimensions. Thus, according to a particular embodiment of the invention, the surface of each first plateau surface 9 is smaller than 25 $mm^2$, preferably smaller than 10 $mm^2$, and more particularly smaller than 1 $mm^2$.

The first plateau surface 9 of a sonotrode welding contact elements is positioned at a first height H1 17 in relation to the sonotrode surface 3. The first height H1 17 of a sonotrode welding contact element 4 is measured according to an imaginary perpendicular line on the sonotrode surface 3 through the midpoint of the first plateau surface 9 of aforesaid sonotrode welding contact element 4. This first height H1 17 is positioned in the same way for all sonotrode welding contact elements 4 on the same sonotrode surface 3. A difference in first height H1 17 between sonotrode welding contact elements 4 positioned on the same sonotrode surface 3 could lead to holes or openings in the plastic to be welded at points where the sonotrode welding contact elements 4 penetrate the plastic layers to be welded, or at points where the sonotrode welding contact elements 4 come into direct contact with at least one part of the anvil 20.

Apart from a first height H1, the sonotrode welding contact elements 4 are also defined by a first width B1 18 that is measured as the smallest distance between two opposing first lateral surfaces 10 measured at a height of 30% from the first height H1 17 in relation to the sonotrode surface 3 on which the sonotrode welding contact elements 4 are positioned, and whereby at least a first width B1 18 is smaller than the first height H1. In the case of conical sonotrode welding contact elements 4 the first width B1 18 should be measured as the smallest diameter of the, preferably circular or elliptical, round form the circumference of which is defined by the first lateral surfaces at a height of 30% of the first height H1 17 in relation to the sonotrode surface 3 on which the sonotrode welding contact elements 4 are positioned. In a preferred embodiment of the invention, the first height H1 17 is at least bigger than aforesaid first width B1 18, preferably at least bigger than twice aforesaid first width B1 18.

Taking into consideration that the typical wall thickness of stretch blown plastic containers 2 is situated in the range of approximately 0.2 to 0.5 mm, the first height H1 17 should be a minimum of 1 mm to allow the sonotrode welding contact element 4 to penetrate both the first plastic layer and the underlying plastic layer, in particular at least a part of the first wall of the blow-moulded surface of the plastic container 2 and at least a part of the underlying wall of the plastic container 2.

According to a particular embodiment of the invention, each aforesaid substantially straight surface 14 makes an angle theta 15 with the first plateau surface 9 with which it borders at least in part, whereby theta 15 is situated in the range 75° to 90°, preferably between 82° and 88°.

According to a particular embodiment of the invention the first height H1 17 is at least bigger than aforesaid first width B1 18, preferably at least bigger than twice aforesaid first width B1 18. Consequently, taking into account aforesaid angle gamma 33 and the ratio of aforesaid first height H1 17 to aforesaid first width B1 33, the sonotrode welding contact elements 4 can be considered as positive protrusions.

Figures 2A, 2B:
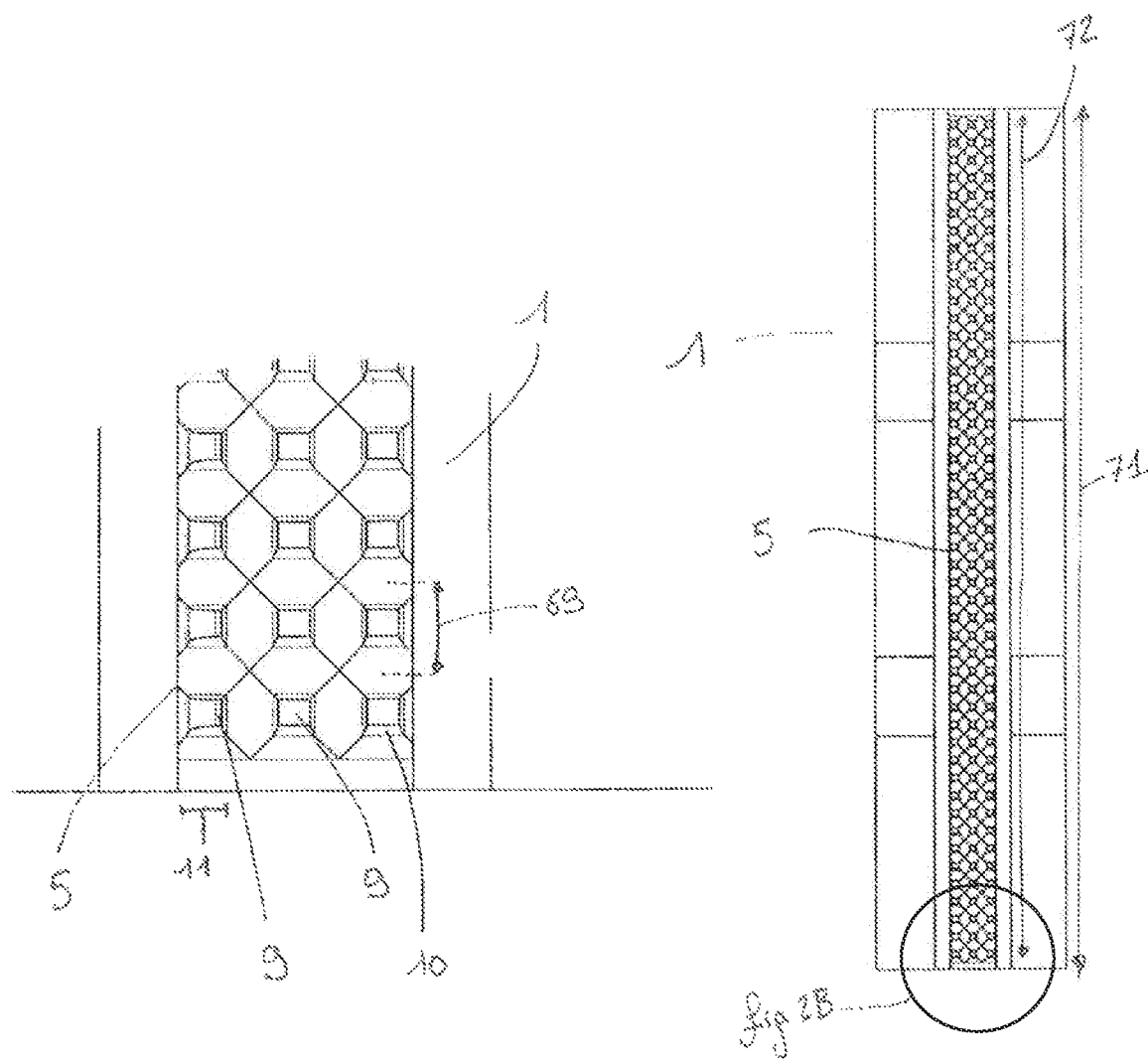
FIG. 2A, abbreviated as FIG. 2A, is a bottom view of the sonotrode of FIG. 1A.
FIG. 2B, abbreviated as FIG. 2B, is an enlarged detailed view of the bottom view of the sonotrode in FIG. 2A.

With reference to FIG. 2A, this is a bottom view of a sonotrode 1 according to a preferred embodiment of the invention. More particularly, this shows a bottom view of the sonotrode surface 3 on which the sonotrode welding contact elements 4 are positioned. The sonotrode surface 3 is preferably rectangular or quadrangular, and comprises at least one sonotrode surface side 5. The length 72 of the sonotrode surface side 5 is preferably equal to the length of the sonotrode 71. Aforesaid geometry of the sonotrode surface 3 and aforesaid length 71 of the sonotrode are not limited to aforesaid geometry and length. The rows of sonotrode welding contact elements 4 are positioned according to aforesaid sonotrode surface side 5. Sonotrode welding contact elements 4 from the same row are positioned an equal distance away from aforesaid sonotrode surface side 5 and at the same distance from the opposing side of aforesaid sonotrode surface side 5.

In FIG. 2B a detailed view of the sonotrode surface structure in FIG. 2A is shown, whereby the first row 11 of sonotrode welding contact elements 4 as described above is shown. The sonotrode 1 comprises three rows of sonotrode welding contact elements 4. According to a preferred embodiment of the invention a sufficient number of sonotrode welding contact elements 4 should be positioned on the sonotrode surface 3 for sufficient fusion of the plastic to be welded to be obtained. A pitch 69 is defined as the centre-to-centre spacing of two neighbouring welding contact elements 4, expressed in both the longitudinal direction of the sonotrode 1, i.e. according to the length 72 of the sonotrode surface side 5, and the transversal direction of the sonotrode, i.e. according to the width 75 of the sonotrode. A preferred embodiment of the sonotrode 1 according to the invention has a pitch of less than five times five (longitudinal direction×transversal direction) the largest diameter of the first plateau surface 9, more preferably less than three times three (longitudinal direction×transversal direction) the largest diameter of the first plateau surface 9. Aforesaid diameter is defined as the shortest distance between two opposing sides of the plateau surface 9 in the case of a polygonal structure, or as the diameter of the circle that defines the circular surface of the plateau surface 9. The pitch 69 should be selected such that at least in one direction, length and/or width, the minimum distance between two neighbouring sonotrode welding contact elements 4, measured parallel to the sonotrode surface 3, is greater than the second width B2 35 of the anvil welding contact elements 22 that is configured to be positioned between the two neighbouring sonotrode welding contact elements 4.

FIG. 3A shows an isometric view of a combination of a sonotrode 1 and an anvil 20 according to a preferred embodiment of the invention. The sonotrode 1 comprises a series of slotted openings 70 to ensure a maximum vibration amplitude in the longitudinal length. The length of the sonotrode 71 is preferably equal to the length 72 of the sonotrode surface side 5.

FIG. 3B shows a detailed view of the sonotrode in FIG. 3A, in which sonotrode welding contact elements 4 of a first row 11 of sonotrode welding contact elements that have a clear structure that differs from the sonotrode welding contact elements 4 of other rows. The sonotrode welding contact elements 4 of the first row 11 comprise a first adapted lateral surface 12, supplemented by, in particular, three lateral surfaces 10.

Figure 4A:
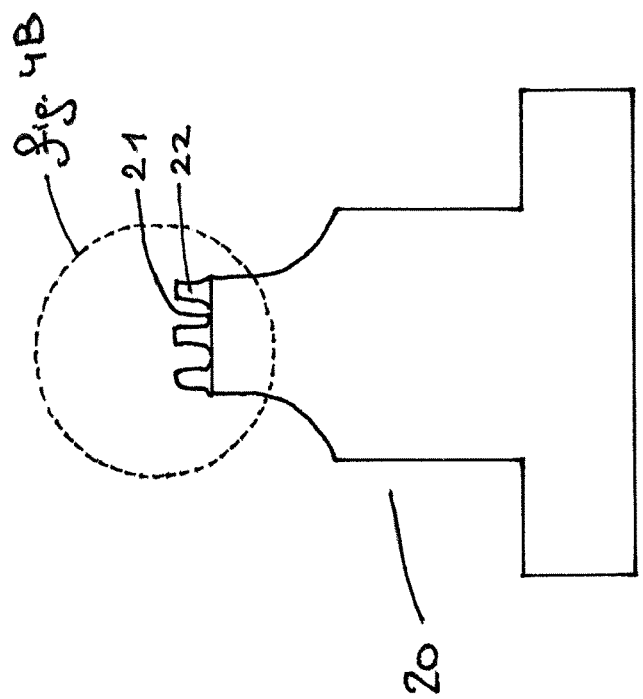
FIG. 4A, abbreviated as FIG. 4A, is a cross-section of an anvil according to an embodiment of the present invention.

FIG. 4A shows a cross-section of an anvil 20 according to a preferred embodiment of the present invention. The anvil 20 should be positioned on a suitable surface (not shown) that provides the necessary stability for the optimum functioning of the anvil during the ultrasonic welding. The anvil 20 according to a particular embodiment of the invention is optimised for ultrasonic welding of plastic, preferably a plastic container 2, and comprises an anvil surface 21 on which three rows of at least one anvil welding contact element 22 are positioned. The anvil welding contact elements, also known as energy directors in the prior art, are positive protrusions provided so that during the ultrasonic welding of the plastic layers they are in contact with at least one part of the plastic layers. The anvil surface 21 is preferably rectangular or quadrangular, and comprises at least one anvil surface side 23. The anvil 20 has been specially developed to contribute to the forming of a weld seam on at least one part of the plastic to be welded. The anvil 20 is preferably made from aluminium, steel or titanium. Aluminium is more often used for low volume applications since an aluminium anvil 20 wears more quickly than titanium or steel. The material of the anvil 20 is not limited to the aforesaid materials, however. The anvil welding contact elements 22 can also be can specially hardened so that wear from usage is slower to occur.

Figure 4B:
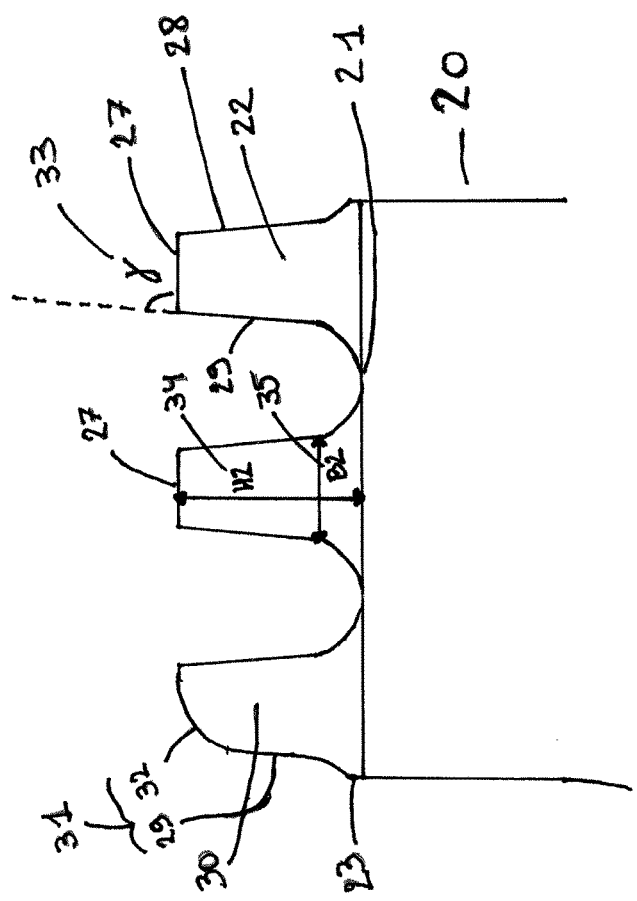
FIG. 4B, abbreviated as FIG. 4B, is an enlarged detailed view of the anvil in FIG. 4A.

FIG. 4B shows a detailed view of the cross-section of the anvil 20 in FIG. 4A. A first row 30 of anvil welding contact elements 22 differs from the other rows of anvil welding contact elements 22 in that aforesaid first row 30 of anvil welding contact elements 22 comprises a second adapted lateral surface 31, whereby the second adapted lateral surface 31 comprises a second substantially straight surface 29 and a second curved surface 32 that has a convex outward arch. Anvil welding contact elements 22 of the first row 30 are consequently defined by aforesaid second adapted lateral surface 31, and typically three second lateral surfaces 28, that are connected to at least one part of a second plateau surface 27. According to a preferred embodiment of the anvil according to the invention the second adapted lateral surface 31 is connected to at least one part of the second plateau surface 27, which defines an anvil welding contact element of the first row 30, and at least one part of the anvil surface side 23. The number of second lateral surfaces 28 is not limited to the aforesaid number of three.

It should be noted that where reference is made to anvil welding contact elements 22 of the first row 30 reference is only being made to anvil welding contact elements 22 of the first row 30 that are provided so that during the ultrasonic welding they are in direct contact with the plastic to be welded, preferably a plastic container, more preferably a tube. Anvil welding contact elements 22 of the first row 30 that are not provided to be in direct contact with the plastic or plastic layers to be welded are not limited to aforesaid structure. The anvil welding contact elements 22 of the other rows, i.e. not first row 30, are defined by a second series of second lateral surfaces 28 and a second plateau surface 27. During the ultrasonic welding of a plastic the second plateau surface 27 of the anvil welding contact element 22 will make direct contact with at least one part of the plastic to be welded, preferably at least one part of the blow-moulded surface of a plastic container.

These second lateral surfaces 28 are connected to at least a part of the second plateau surface 27. According to a particular embodiment of the invention the second plateau surface 27 of the anvil welding contact elements 22 of the first row 30 is smaller than the second plateau surfaces 27 of the anvil welding contact elements 22 of the non-first row. The second plateau surface 27 of the anvil welding contact elements 22 of the non-first row is preferably rectangular with a surface of 0.80 mm×0.88 mm, unlike the second plateau surface 27 of the anvil welding contact elements 22 of the first row 30 that preferably have a surface of 0.1 mm×0.88 mm. However, the shape of the first second surfaces 27, and the dimensions are not limited to aforesaid form and dimensions. Thus, according to a particular embodiment of the invention the surface of each second plateau surface 27 is smaller than 25 $mm^2$, preferably smaller than 10 $mm^2$, and more particularly smaller than 1 $mm^2$.

The second plateau surface 27 of an anvil welding contact element is positioned at a second height H2 34 in relation to the anvil surface 21. The second height H2 34 of an anvil welding contact element 22 is measured according to an imaginary perpendicular line on the anvil surface 21 through the midpoint of the second plateau surface 27 of aforesaid anvil welding contact element 22. This second height H2 34 is the same for all anvil welding contact elements 22 positioned on the same anvil surface 21. A difference in second height H2 34 between anvil welding contact elements 22 positioned on the same anvil surface 21 could lead to holes or openings in the plastic to be welded at points where the anvil welding contact elements 4 penetrate the plastic layers to be welded, or at points where the anvil welding contact elements 22 come into direct contact with at least one part of the anvil 1.

Apart from a second height H2 34, the anvil welding contact elements 22 are also defined by a second width B2 35 that is measured as the smallest distance between two opposing second lateral surfaces 28 measured at a height of 30% of the second height H2 34 in relation to the anvil surface 21 on which the anvil welding contact elements 22 are positioned, and whereby at least one second width B2 35 is smaller than the second height H34. In the case of conical anvil welding contact elements 22 the second width B2 35 should be measured as the smallest diameter of the, preferably circular or elliptical, round form the circumference of which is defined by the second anvil surfaces 28 at a height of 30% of the second height H2 34 in relation to the anvil surface 21 on which the anvil welding contact elements 22 are positioned. In a preferred embodiment of the invention, the second height H2 34 is at least bigger than the second width B2 25, preferably at least bigger than twice aforesaid second width B2 35.

Taking into consideration that the typical wall thickness of stretch blown plastic containers is situated in the range of approximately 0.2 to 0.5 mm, the second height H2 34 should be a minimum of 1 mm, to allow the anvil welding contact element 22 to penetrate both the first plastic layer and the underlying plastic layer, preferably at least one part of the first wall of the plastic container 2 and at least one part of the top wall of the plastic container 2, whereby the wall is part of the blow-moulded surface of the plastic container 2.

According to a particular embodiment of the invention, each aforesaid second substantially straight surface 29 makes an angle gamma 33 with the second plateau surface 27 with which it borders at least in part, whereby gamma 33 is situated in the range 75° to 90°, preferably between 82° and 88°.

According to a particular embodiment of the invention, the second height H2 34 is at least bigger than aforesaid second width B2 35, preferably at least bigger than twice aforesaid second width B2 35. Consequently, taking into account aforesaid angle gamma 33 and the ratio of aforesaid second height H2 34 to aforesaid second width B2 35, the anvil welding contact elements are considered as positive protrusions.

Figures 5A, 5B:
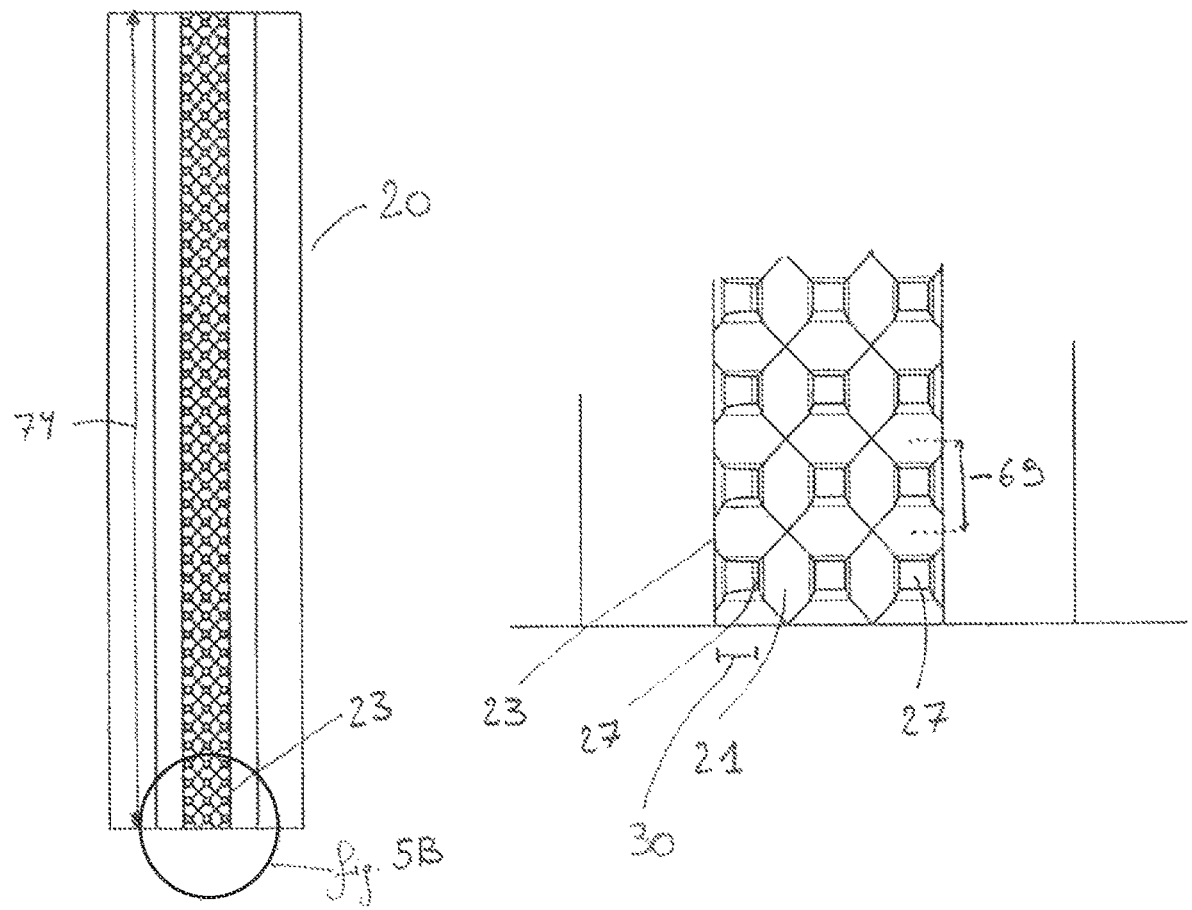
FIG. 5A, abbreviated as FIG. 5A, is a top view of the anvil in FIG. 4A.
FIG. 5B, abbreviated as FIG. 5B, is a detailed view of the top view of the anvil in FIG. 5A.

With reference to FIG. 5A, this is a top view of an anvil 20 according to a preferred embodiment of the invention. More particularly, this shows a top view of the anvil surface 21 on which the anvil welding contact elements 22 are positioned. The anvil surface 21 is preferably rectangular or quadrangular, and comprises at least one anvil surface side 23. The length 74 of the anvil surface side 23 is preferably equal to the length of the anvil 73. The geometry of the anvil surface 21 and aforesaid length 73 of the anvil are not limited to aforesaid geometry and length. The rows of anvil welding contact elements 22 are positioned according to aforesaid anvil surface side 23. Anvil welding contact elements 22 from the same row are positioned an equal distance away from aforesaid anvil surface side 23 and at the same distance from the opposing side of aforesaid anvil surface side 23.

FIG. 5B shows a detailed view of the anvil surface structure in FIG. 5A, whereby the first row 30 of anvil welding contact elements 22 as described above is shown. The anvil 20 comprises three rows of anvil welding contact elements 22. According to a preferred embodiment of the invention a sufficient number of anvil welding contact elements 22 should be positioned on the anvil surface 21 for sufficient fusion of the plastic layers to be welded to be obtained. Just as for the sonotrode 1, a pitch 69 is defined as centre-to-centre distance between two neighbouring welding contact elements 22, expressed in both the longitudinal direction of the anvil 20, i.e. according to the length 74 of the anvil surface side 23, and the transversal direction of the anvil, i.e. according to the width 76 of the anvil. A preferred embodiment of the anvil 20 according to the invention has a pitch of less than five times five (longitudinal direction× transversal direction) the largest diameter of the second plateau surface 27, more preferably less than three times three (longitudinal direction×transversal direction) the largest diameter of the second plateau surface 27. Aforesaid diameter is defined as the shortest distance between two opposing sides in the case of a polygonal structure, or as the diameter of the circle that defines the circular surface of the plateau surface 27. The pitch 69 should be selected such that at least in one direction, length and/or width, the minimum distance between two neighbouring anvil welding contact elements 22, measured parallel to the anvil surface 21, is greater than the first width B1 18 of the sonotrode welding contact elements 4 that is configured to be positioned between the two neighbouring anvil welding contact elements 22.

FIG. 6A shows an isometric view of a combination of an anvil 20 and a sonotrode 1 according to a preferred embodiment of the invention. The elements defined for the sonotrode 1 are also shown in FIG. 3A and described above. The length of the anvil 73 is preferably equal to the length 74 of the anvil surface side 23.

FIG. 6B shows a detailed view of the anvil 20 in FIG. 3A, in which anvil welding contact elements 22 of a first row 30 of anvil welding contact elements 22 have a clear structure that differs from the anvil welding contact elements 22 of other rows. The anvil welding contact elements 22 of the first row 30 comprise a second adapted lateral surface 31, supplemented by, in particular, three second lateral surfaces 28.

FIG. 7 shows a combination of a sonotrode 1 and an anvil 20 according to a preferred embodiment of the invention. The sonotrode 1 and the anvil 20 have characteristics as described above. With reference to this embodiment of the invention it should be noted that the sonotrode welding contact elements 4 align alternately with the anvil welding contact elements 22 whenever the sonotrode 1 and the anvil 20 are at a distance from each other that is smaller than the sum of the first height H1 17 and the second height H2 34. Alternate alignment means the alternating positioning of sonotrode 1 and anvil 20 welding contact elements 4, 22, such that the space between two neighbouring sonotrode welding contact elements 4 can be filled with an anvil welding contact element 22 whenever the sonotrode 1 and the anvil 20 move towards each other, whereby the welding contact surface between the plastic layers to be welded, increases preferably at least one part of the blow-moulded surface of a plastic container 2, and the welding contact elements 4, 22. In this way a stronger weld seam is obtained. According to a particular embodiment of the invention the length 71 of the sonotrode 1 is at least bigger than the length 73 of the anvil 20. The length of the sonotrode in relation to the length of the anvil is not limited to the aforesaid ratio, however.

FIG. 8 shows an isometric view of the combination in FIG. 7, whereby at least one part of the plastic container 2 is positioned in the space between the sonotrode 1 and the anvil 20. The plastic container 2 comprises an open mouth 92 and a blow-moulded surface 91.

According to a particular method of the invention for producing a plastic container 2, the plastic container is obtained by a step of preform injection moulding in a plastic that can be extended biaxially, i.e. along two axes. This preform is preferably produced in polypropylene, but it can also be made from other polyolefins such as polyethylene or polyesters such as PET. In an alternative method, the preforms can comprise two or more layers, whereby the layers comprise different plastics. These plastics can be selected to improve the barrier properties in respect of gas, moisture, light or chemicals. It is, furthermore, also possible to very quickly switch between colours or additives in the injection moulding process of the preform. These various preforms can then be blown identically. This switching is not possible in the production of extruded tubes, since changing over an extrusion line is much more difficult and consequently costlier than changing over an injection moulding machine. In a second step the preform is blown in the manner of stretch blowing. In doing so, the material is provided with a biaxial extension, which gives the material exceptional material properties in terms of strength and transparency. A particular element involves the inclusion in the blowing process of an advantageous way of embossing. To this end, on a flat plate a structure is hollowed out, preferably by means of etching, whereby the flat plate comprises an etchable material, preferably steel. Then the plates are applied in the blow mould. Recesses can be provided in the blow mould to allow these plates to drop onto the surface. The securing of the plates can take place by means of reversible adhesive systems or by means of magnets arranged in the blow mould. As an additional particular element, the stretch blowing method offers greater freedom in moulding. This allows various additional design elements to be added to the bottle. According to a particular embodiment of the method according to the invention, in a next step of the production the blown plastic container 2 is cut to the desired length. This can preferably be performed using a guillotine system, possibly using laser cutting or possibly with contour cutting. The cutting step, however, is not restricted to coming before the step of ultrasonic welding of the plastic container 2. In a particular embodiment of the invention the cutting step can be carried out during the ultrasonic welding of the plastic container 2. More particularly, the cutting step of the plastic container 2 can be carried out after the ultrasonic welding step.

FIG. 9 shows the combination of a sonotrode 1 and an anvil 20, as in FIG. 8. The sonotrode 1 and/or anvil 20 described are preferably used in a method for producing a plastic container 2, whereby at least one step of ultrasonic welding of the plastic container 2 for the forming of a weld seam 80 according a weld section 90 on at least one part of a blow-moulded surface 91 of the plastic container 2 in order to provide the plastic container 2 with at least one seal. According to a preferred embodiment of the invention at least one part of the weld seam 80 is produced by the sonotrode 1 or anvil 20 described, or a combination of the two.

According to a preferred embodiment of a method for producing a plastic container, the step of ultrasonic welding comprises the following steps:

a. Determining aforesaid weld section 90 on aforesaid blow-moulded surface 91 of aforesaid plastic container 2, b. Clamping of aforesaid plastic container 2 between aforesaid sonotrode 1 and/or aforesaid anvil 20, preferably between the combination, whereby aforesaid welding contact elements 4, 22 are connected with at least one part of aforesaid weld section 90, c. Forming of aforesaid weld seam 80;

The plastic container is produced according to a step of injection moulding of a biaxially extendable plastic container preform, whereby aforesaid plastic container preform comprises an open mouth and a sealed bottom. The open mouth is positioned opposite the sealed bottom. Furthermore, a step of stretch blowing of aforesaid biaxially extendable plastic container preform in a blow mould is applied, whereby the plastic container preform expands biaxially in the blow mould into aforesaid plastic container that is to be ultrasonically welded.

It may also be possible to reverse the step of cutting and welding. In doing so, the uncut bottle has a welded joint applied and is only cut in a subsequent step. This way of working has the major advantage that the trimming of the welded joint can be performed in one step with the cutting of the bottles.

FIG. 10 shows the step of clamping of the plastic container 2 between the sonotrode 1 and/or the anvil 20, preferably between the combination according to invention. If the sonotrode 1 is operated for transferring mechanical energy via at least one part of the sonotrode welding contact elements 4, at least one part of the weld seam 80 can be obtained before sealing of the plastic container 2. The sonotrode 4 and anvil 22 welding contact elements come into direct contact with at least one part of the blow-moulded surface 91 of the plastic container 2. The weld section 90 can be determined at an arbitrary distance from the open mouth 92 of the plastic container 2. The first row of sonotrode welding contact elements 11 and the first row of anvil welding contact elements 30 should always be positioned at the edge of the opening mouth 92.

FIG. 11A and FIG. 11B show a cross-section of the combination of the sonotrode 1 and the anvil 20 during clamping of the plastic container for the forming of a weld seam 80. The position of the first row of sonotrode welding contact elements 11 and the first row of anvil welding contact elements 30 in relation to the open mouth 92 of the plastic container 2 to be welded is clearly shown.

FIG. 12A shows a front view of the combination in FIG. 10. FIG. 12B shows a detailed view of the front view in FIG. 12A. According to a particular embodiment of the invention, the sonotrode welding contact elements 4 align alternately in relation to the anvil welding contact elements 22 whenever the sonotrode 1 and the anvil 20 are at a distance from each other that is smaller than the sum of the first height H1 17 and second height H2 34. Alternate alignment means the alternating positioning of sonotrode 1 and anvil 20 welding contact elements 4, 22, such that the space between two neighbouring sonotrode welding contact elements 4 can be filled with an anvil welding contact element 22 whenever the sonotrode 1 and the anvil 20 move towards each other, whereby the welding contact surface between the plastic layers to be welded, preferably at least one part of the blow-moulded surface of a plastic container 2, and the welding contact elements 4, 22, increases. In this way a stronger weld seam is obtained.

Figure 13:
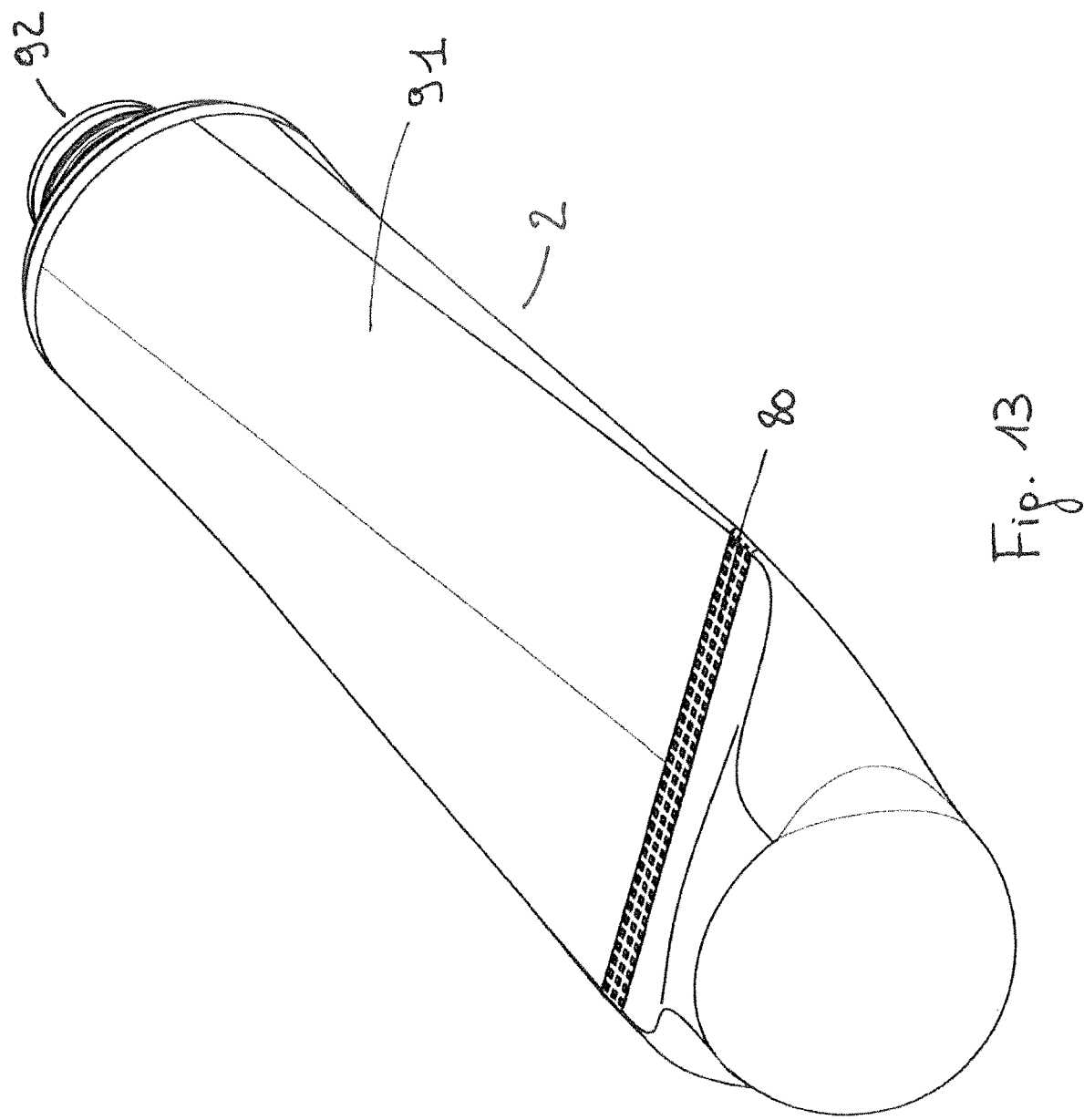
FIG. 13, abbreviated as FIG. 13, is an isometric view of a plastic container comprising a weld seam obtained according to a preferred method comprising a step of ultrasonic welding, whereby the sonotrode and the anvil are used according to an embodiment of the invention.

FIG. 13 shows an isometric view of a plastic container 2 comprising a weld seam 80 obtained according to a preferred method of the invention comprising a step of ultrasonic welding, whereby the sonotrode 1 and the anvil 20 are used according to an embodiment of the invention. This plastic container 2, preferably a tube, still has to be cut according to a cutting line that can be defined between the weld seam 80 and the bottom of the plastic container 2, whereby the bottom is positioned opposite to the open mouth 92.

Figure 14:
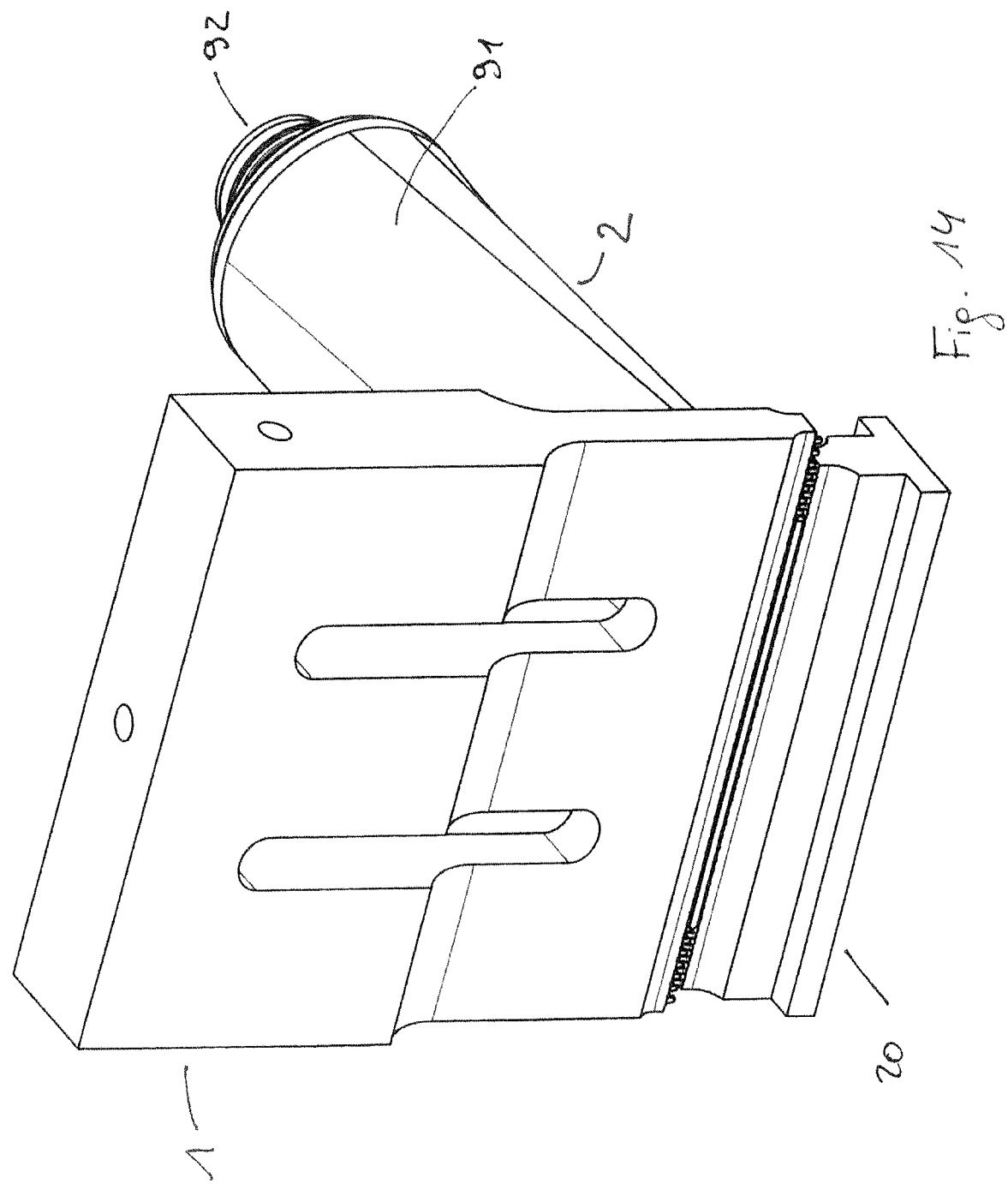
FIG. 14, abbreviated as FIG. 14, is an isometric view of the combination in FIG. 10, whereby a bottom of the plastic container is cropped.

FIG. 14 shows an isometric view of the combination in FIG. 10, whereby a bottom of the plastic container is cropped.

Figure 15:
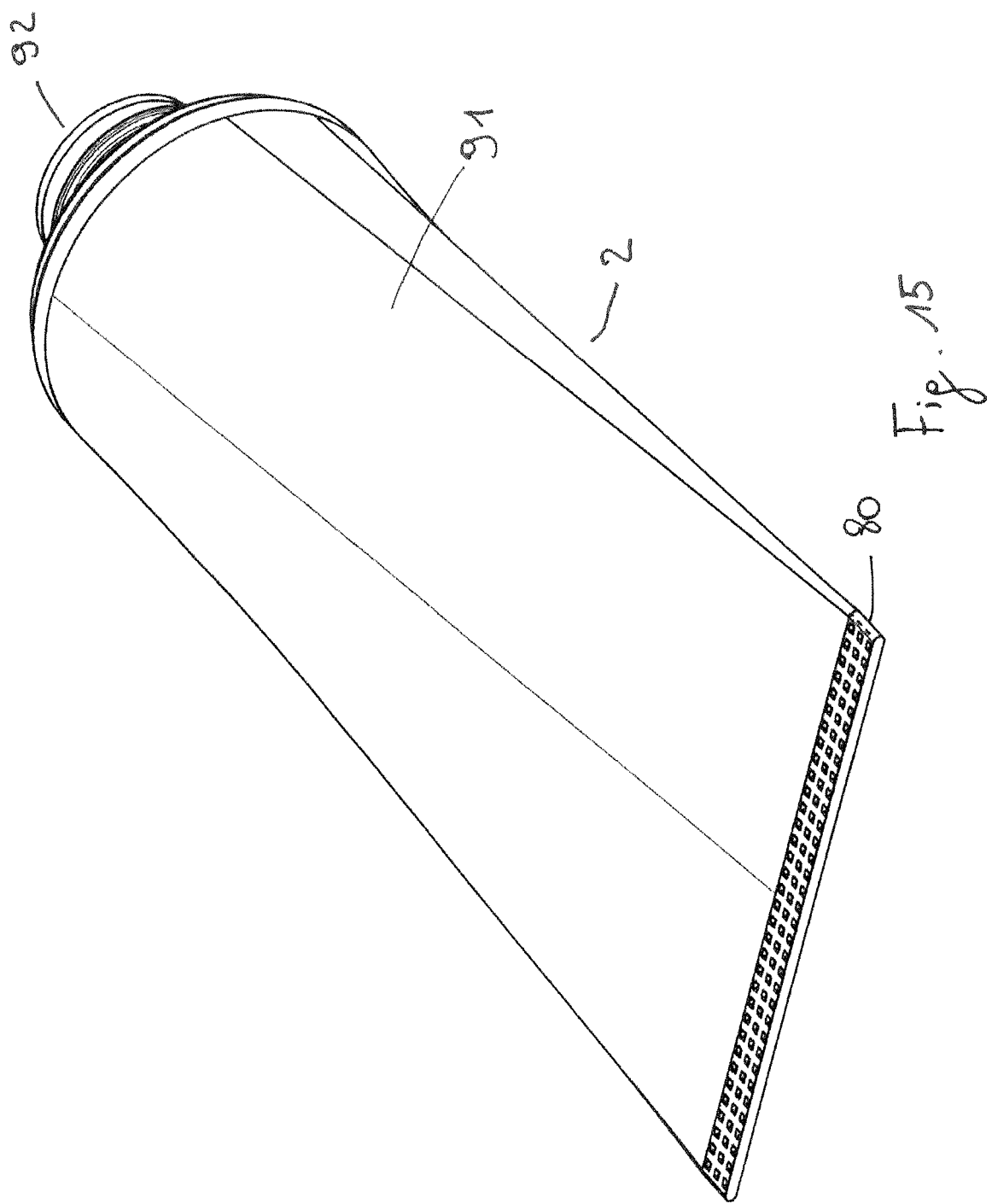
FIG. 15, abbreviated as FIG. 15, is an isometric view of a plastic container, preferably a tube, obtained according to at least one of a preferred method for producing a plastic container according to the invention.

FIG. 15 shows an isometric view of a plastic container 2, preferably a tube, obtained according to at least one of a preferred method for producing a plastic container according to the invention.

FIG. 16 to FIG. 19 provide a schematic representation of a positioning, i.e. an alternating pattern, of the sonotrode welding contact elements 4, i.e. the black squares, in relation to the anvil welding contact elements 22, according to preferred embodiments of the invention, whereby the pitch has been adapted from figure to figure. The size and shape of the welding contact elements are the same in FIG. 16 to FIG. 19 for simplicity of the representation. However, the size and shape of the welding contact elements can differ as described above for the invention.

Figure 16:
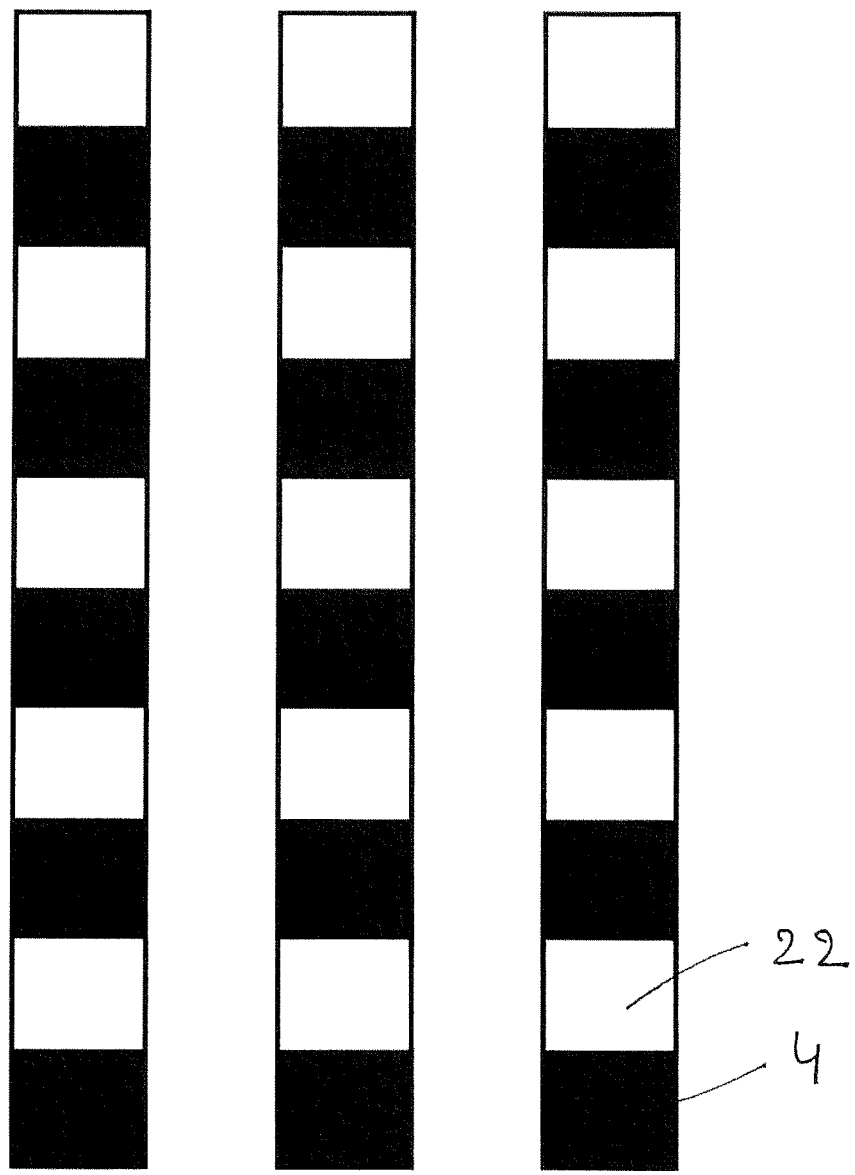
FIG. 16, abbreviated as FIG. 16, is a schematic representation of alternating pattern of sonotrode and anvil welding contact elements according to a preferred embodiment of the invention.

FIG. 16 presents a schematic pattern of a preferred embodiment according to the invention and the pitch is the same in the longitudinal and transversal directions. The welding contact elements are alternately aligned such that the pitch should be greater than the width B1 18, B2 35, of the welding contact elements.

Figure 17:
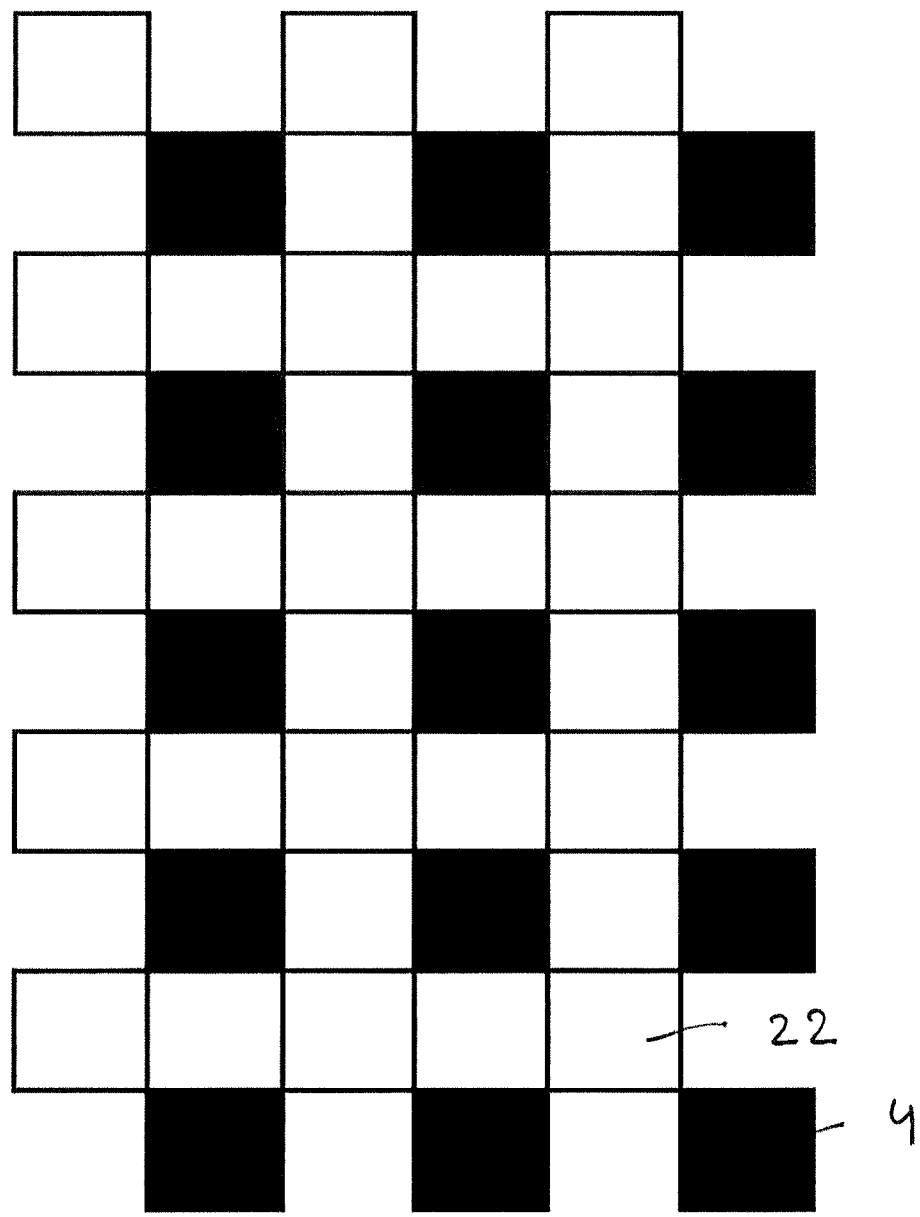
FIG. 17, abbreviated as FIG. 17, is a schematic representation of an alternating pattern of sonotrode and anvil welding contact elements according to a preferred embodiment of the invention.

FIG. 17 presents a schematic pattern of a preferred embodiment according to the invention and the pitch is the same in the longitudinal and in the transversal directions. The welding contact elements are alternately aligned such that the pitch should be greater than the width B1 18, B2 35, of the welding contact elements. Compared with the embodiment in FIG. 16, the row of sonotrode welding contact elements 4 is shifted by one pitch in the transversal direction of the sonotrode 1 (or of the anvil 20).

Figure 18:
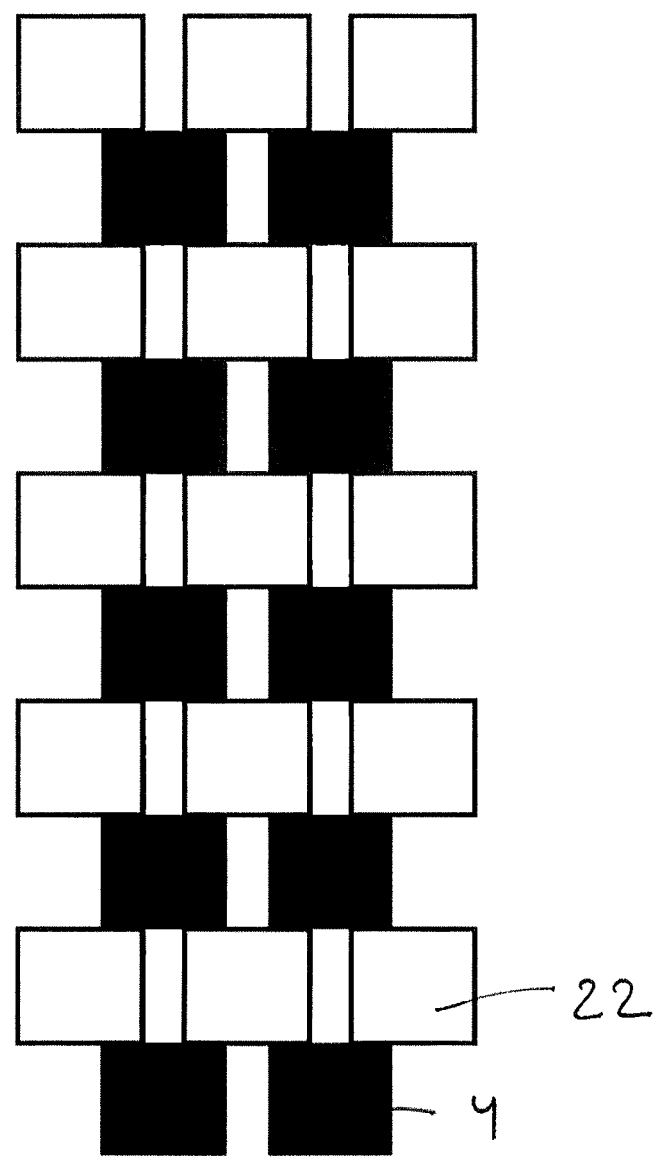
FIG. 18, abbreviated as FIG. 18, is a schematic representation of an alternating pattern of sonotrode and anvil welding contact elements according to a preferred embodiment of the invention.

FIG. 18 presents a schematic pattern of a preferred embodiment according to the invention and the pitch in the longitudinal direction is greater than in the transversal direction of the sonotrode 1 (or of the anvil 20).

Figure 19:
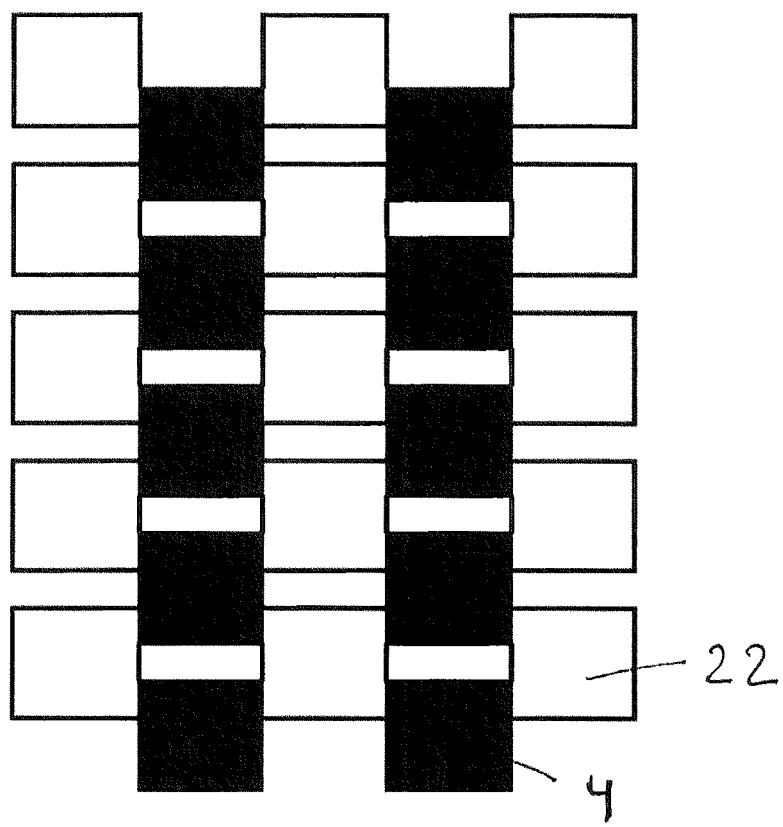
FIG. 19, abbreviated as FIG. 19, is a schematic representation of an alternating pattern of sonotrode and anvil welding contact elements according to a preferred embodiment of the invention.

In FIG. 19 presents an alternating pattern of a preferred embodiment according to the invention and the pitch in the longitudinal direction is smaller than in the transversal direction of the sonotrode 1 (or of the anvil 20).

No ISO standard is available for drop testing, because a failed weld seam does not represent a safety risk. So, it is necessary to "play it by ear" when performing this. The aim here is to obtain a product that does not fail in a standard consumer environment. Here, drop tests are performed from table height of 1 m and cabinet height of 1.8 m whereby the flexible plastic container, preferably tubes, fall with an arbitrary orientation onto a concrete floor. Flexible plastic container, preferably tubes, welded with the standard method via hot stamping, welded by pressing together between hot elements or welded via ultrasonic welding with a flat sonotrode and anvil exhibit partial or complete breaking apart of the weld seam at a drop height of just 1 m. Flexible plastic containers, preferably tubes welded via the described method of ultrasonic welding, but without the deviating form of the first row of welding contact elements exhibit a clear improvement in the weld strength following the drop tests. With these flexible plastic containers, preferably tubes, the weld seam no longer breaks apart in full or in part, although splitting does occur where the weld seam joins the body of the tube.

Flexible plastic containers, preferably tubes, welded via the described method in which a convex curved surface is added to the first row of welding contact elements, exhibit no damage to the weld seam in drop tests.

At least one of aforesaid preferred methods of the invention allows an empty plastic container, preferably a tube, to be produced which can be directly supplied to a filling machine. Through the production of a tube via the stretch blowing method, a tube can be produced with a relatively large drain opening. As a result, the drain opening can be made bigger than 10 mm, preferably even bigger than 15 mm, more particularly bigger than 20 mm. This allows the tube to be filled via the drain opening. To this end, the tube can either be supplied via a neck support, or the tube can be positioned in a holder that allows the tube to be positioned upright.

It is clear that, while the embodiments and/or the materials for providing embodiments according to present invention have been discussed, various changes or alterations can be made without deviating from the scope and/or the spirit of this invention.

Tubes produced via this method thus have a number of important advantages in terms of flexibility of production, decoration and filling.

The invention claimed is:

1. A combination of a sonotrode and an anvil for ultrasonic welding of plastic,
wherein said sonotrode comprises:
a sonotrode surface for the positioning of sonotrode welding contact elements, said sonotrode surface comprising at least one sonotrode surface side; and
at least one row of at least one sonotrode welding contact element provided so that during the welding the at least one row of at least one sonotrode welding contact element is in contact with the plastic, said at least one sonotrode welding contact element comprising:
a first plateau surface having a first edge and a second edge opposite the first edge;
a first lateral surface extending from the first edge of the plateau surface, said first lateral surface comprising a first substantially straight surface, said at least one row of at least one sonotrode welding contact element being positioned according to said sonotrode surface side; and
a second lateral surface extending from the second edge of the plateau surface, the second lateral surface being substantially straight,
wherein said first lateral surface comprises a first curved surface positioned between said first plateau surface and said first substantially straight surface, wherein said first curved surface has a convex outward arch, and
wherein said anvil comprises:
an anvil surface is for the positioning of anvil welding contact elements, said anvil surface comprising at least one anvil surface side; and
at least one row of at least one anvil welding contact element provided so that during the welding at least one row of at least one anvil welding contact element is in contact with the plastic, wherein said anvil welding contact element comprises a second plateau surface and a second series of at least one second lateral surface, wherein said second lateral surface comprises a second substantially straight surface, wherein said at least one row of at least one anvil welding contact element is positioned according to said anvil surface side,
wherein said second series of each said anvil welding contact element of a first row comprises a second adapted lateral surface that joins at least one part of said second plateau surface with at least one part of said anvil surface side, wherein said second adapted lateral surface comprises a second curved surface positioned between said second plateau surface and said second substantially straight surface, wherein said second curved surface has a convex outward arch, and
wherein said sonotrode welding contact element is positioned in relation to said anvil welding contact element such that said sonotrode welding contact element is positioned during welding next to said anvil welding contact element and is provided to form each at least one part of a weld seam.

2. The combination according to claim 1, wherein said first substantially straight surface and said first plateau surface of said sonotrode welding contact element define an angle theta, whereby theta is situated in the range 75° to 90°.

3. The combination according to claim 1, wherein said sonotrode welding contact element defines a first height H1 and a first width B1, wherein said first height H1 is at least bigger than said first width B1.

4. The combination according to claim 1, wherein the size of said first plateau surface of said sonotrode welding contact element is smaller than 25 mm².

5. The combination according to claim 1, wherein said second substantially straight surface and said second plateau surface of said anvil welding contact element define an angle gamma, whereby gamma is situated in the range 75° to 90°.

6. The combination according to claim 1, wherein said anvil welding contact element defines a second height H2 and a second width B2, wherein said second height H2 is at least bigger than said second width B2.

7. The combination according to claim 1, wherein the size of said second plateau surface of said anvil welding contact element is smaller than 25 mm².

8. The combination according to claim 1, wherein said first row of ultrasonic welding contact elements is positioned directly opposite said first row of anvil welding contact elements.

9. The combination according to claim 3, wherein said anvil welding contact element defines a second height H2 and a second width B2,
wherein said second height H2 is at least bigger than said second width B2, and
wherein the ratio of said first height H1 to said first width B1 is the same as the ratio of said second height H2 to said second width B2.

10. A method for producing a plastic container, comprising at least a step of ultrasonic welding of said plastic container for the forming of a weld seam according to a weld section on at least one part of a blow-moulded surface of said plastic container in order to provide said plastic container with at least one seal,
wherein said step of ultrasonic welding is carried out by the combination according to claim 1.

11. The method for producing a plastic container according to claim 10, wherein said step of ultrasonic welding comprises the following steps:
determining said weld section on said blow-moulded surface of said plastic container;
clamping said plastic container between said sonotrode and/or said anvil, wherein said welding contact elements are connected with at least one part of said weld section; and
forming said weld seam.

12. The method for producing a plastic container according to claim 10, further comprising the following steps:
injection moulding of a biaxially extendable plastic container preform, wherein said plastic container preform comprises an open mouth and a sealed bottom, wherein said open mouth is positioned opposite said sealed bottom; and
stretch blowing of said biaxially extendable plastic container preform in a blow mould, wherein said plastic container preform expands biaxially in said blow mould into said plastic container comprising said blow-moulded surface that is to be at least in part ultrasonically welded.

13. The method for producing a plastic container according to claim 12, further comprising a step of embossing said blow-moulded surface during said step of stretch blowing, wherein said step of embossing is carried out in said blow mould comprising at least a plate.

14. The method for producing a plastic container according to claim 10, further comprising a step of cutting said plastic container, wherein said step of cutting is carried out before, during or after the ultrasonic welding of said plastic container.

15. The method for producing a plastic container according to claim 14, wherein said step of cutting is carried out mechanically or ultrasonically.

16. A plastic container obtained according to claim 10.

17. A method for filling the plastic container according to claim 16, wherein the filling takes place through said open mouth.

18. A method of using the plastic container obtained according to claim 10, comprising the step of packaging pharmaceuticals, medicines, cosmetics or foodstuffs with the plastic container.

19. The combination according to claim 2, wherein said sonotrode welding contact element defines a first height H1 and a first width B1, wherein said first height H1 is at least bigger than said first width B1.

20. The combination according to claim 2, wherein the size of said first plateau surface of said sonotrode welding contact element is smaller than 25 mm$^2$.

* * * * *